E. E. CLEMENT.
TELEPHONE EXCHANGE SYSTEM.
APPLICATION FILED APR. 23, 1908.

1,105,490.

Patented July 28, 1914.
14 SHEETS—SHEET 1.

Witnesses
H. R. Whiting
L. A. Stanley

Inventor
By Edward E. Clement
Attorney

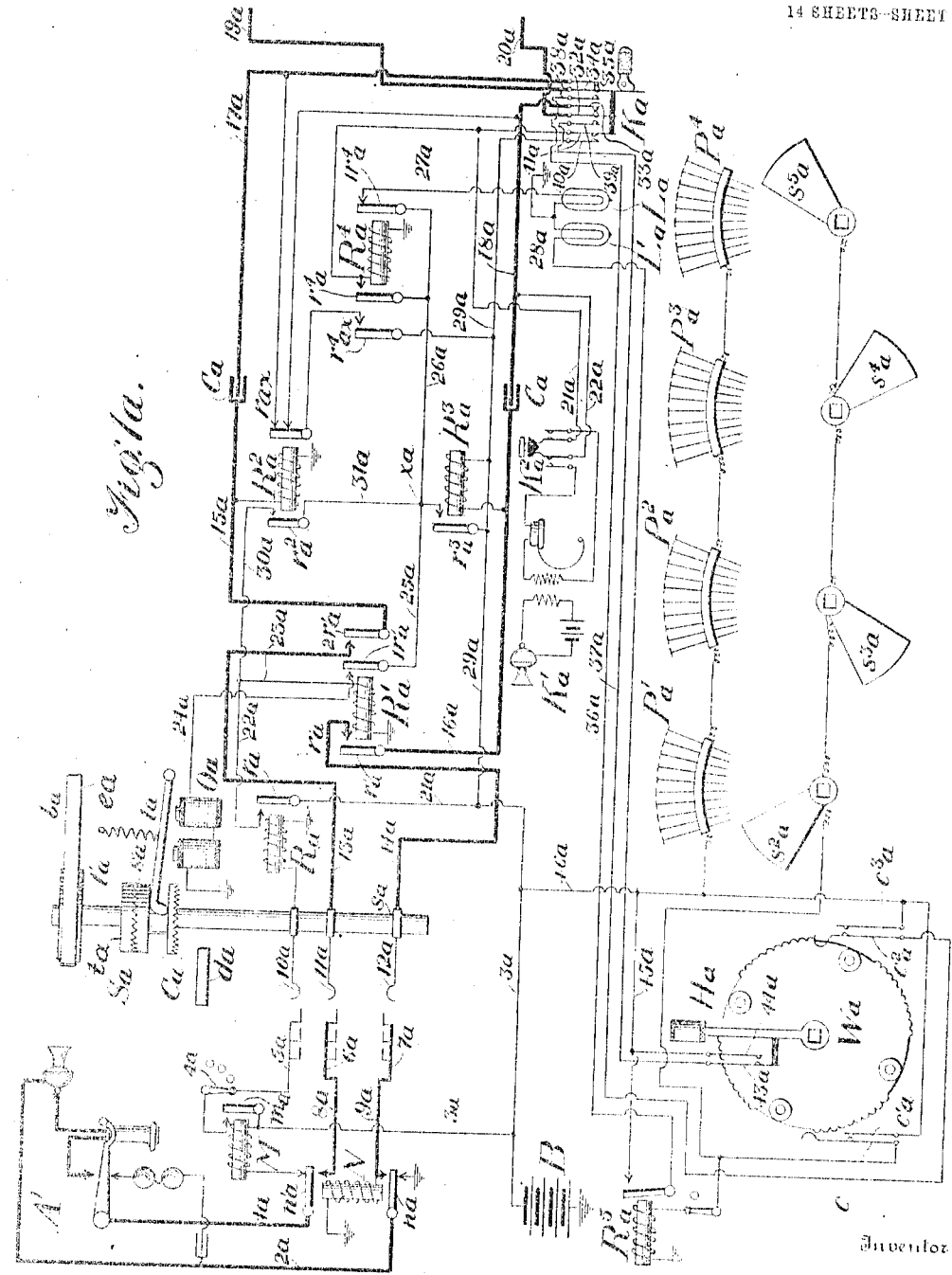

E. E. CLEMENT.
TELEPHONE EXCHANGE SYSTEM.
APPLICATION FILED APR. 23, 1908.

1,105,490.

Patented July 28, 1914.
14 SHEETS—SHEET 3.

Inventor
Edward E. Clement

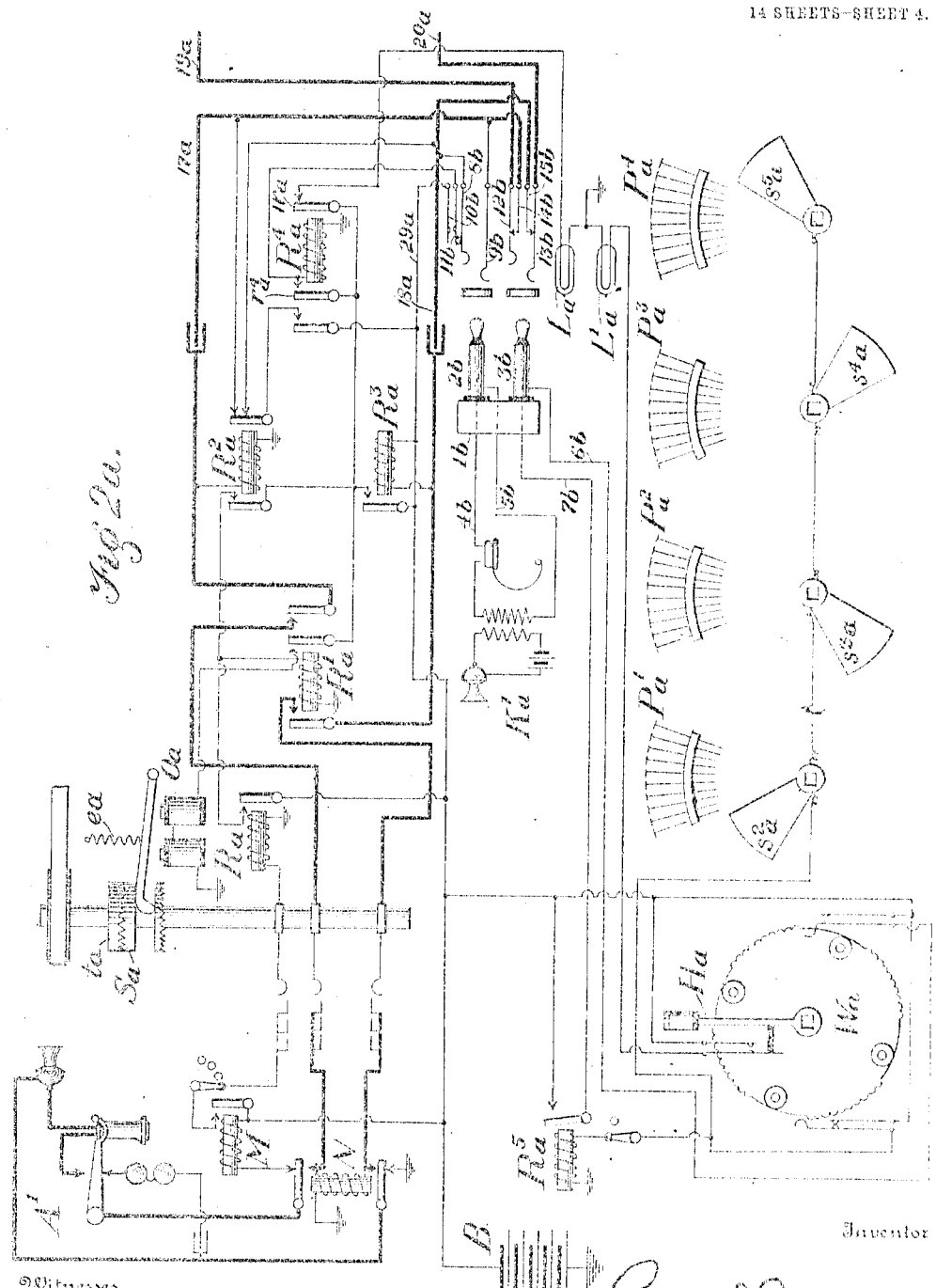

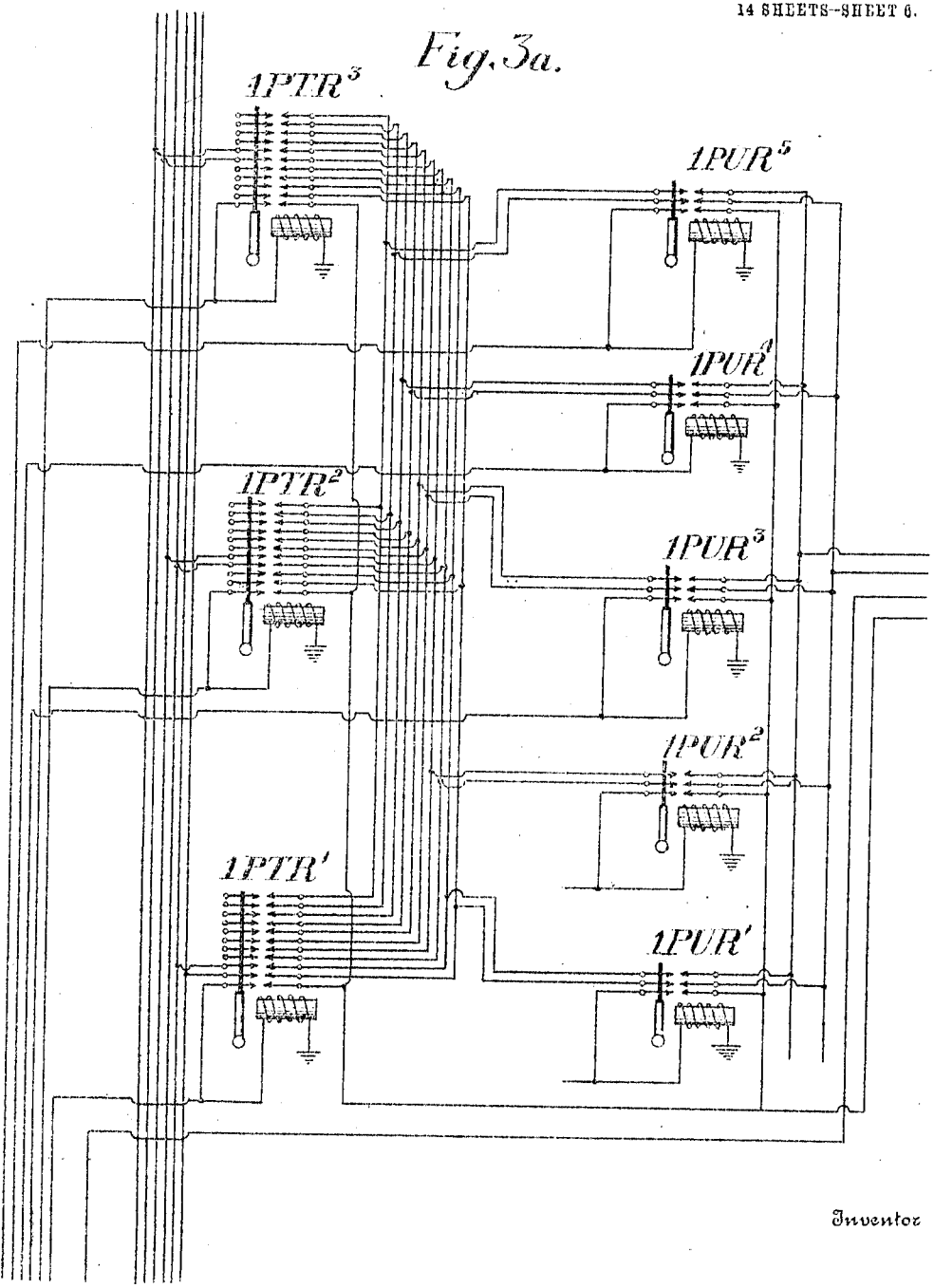

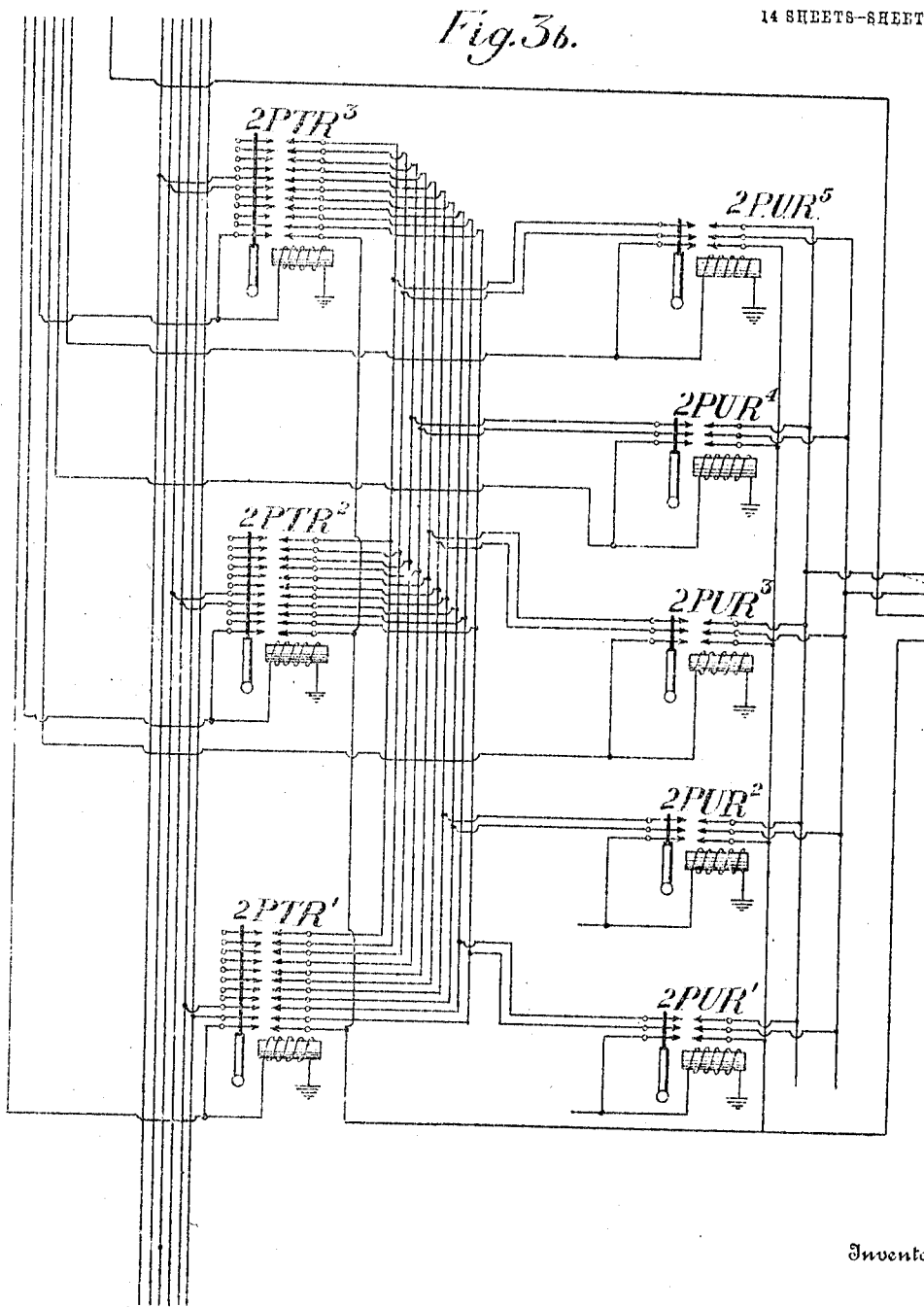

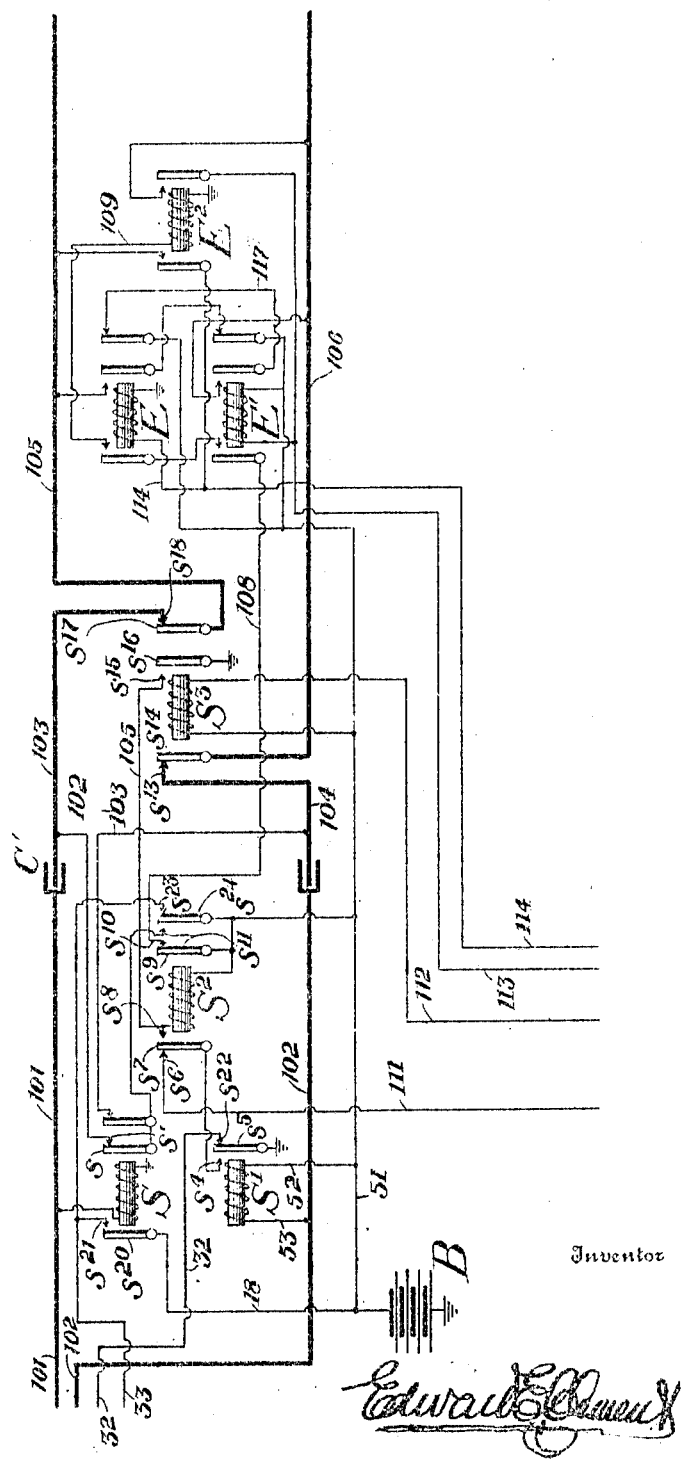

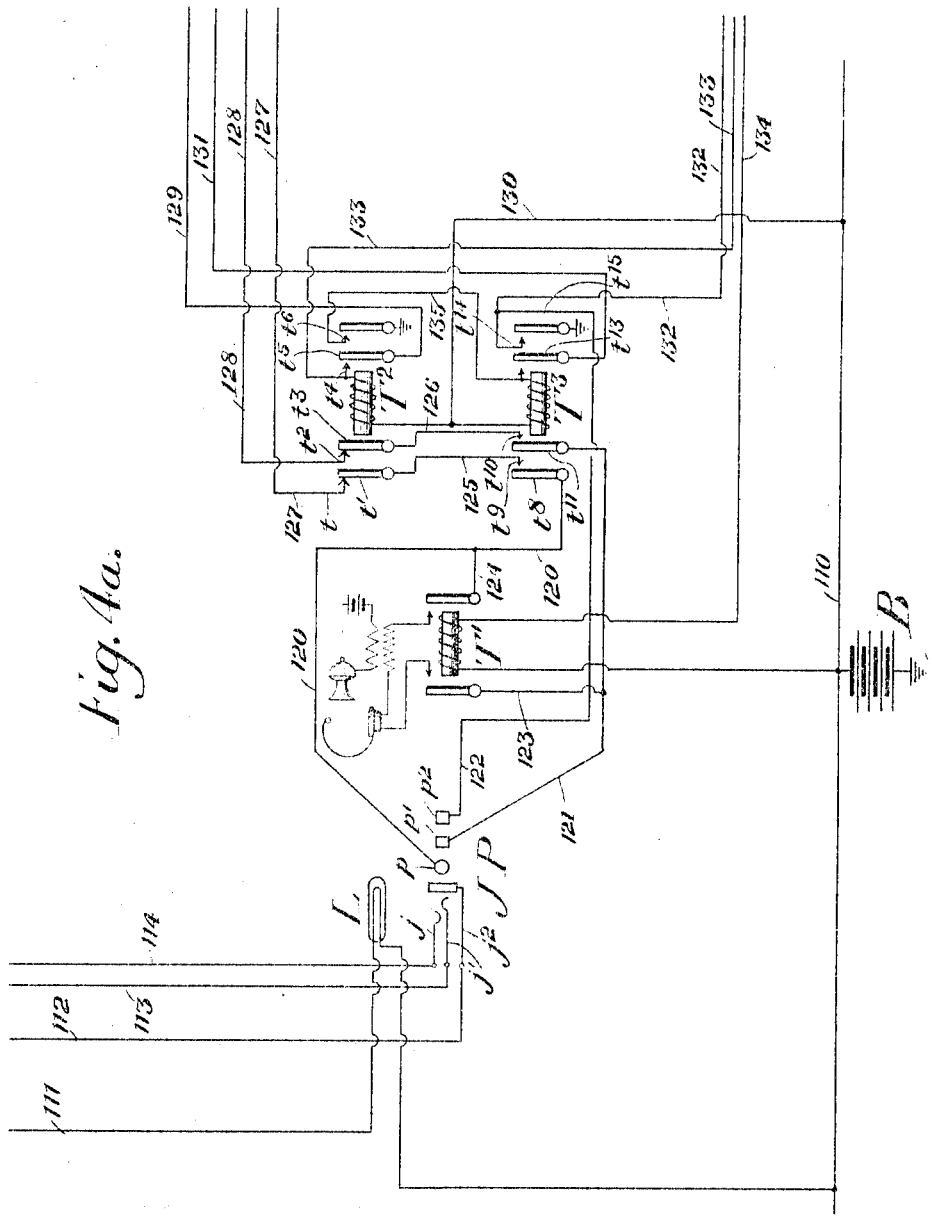

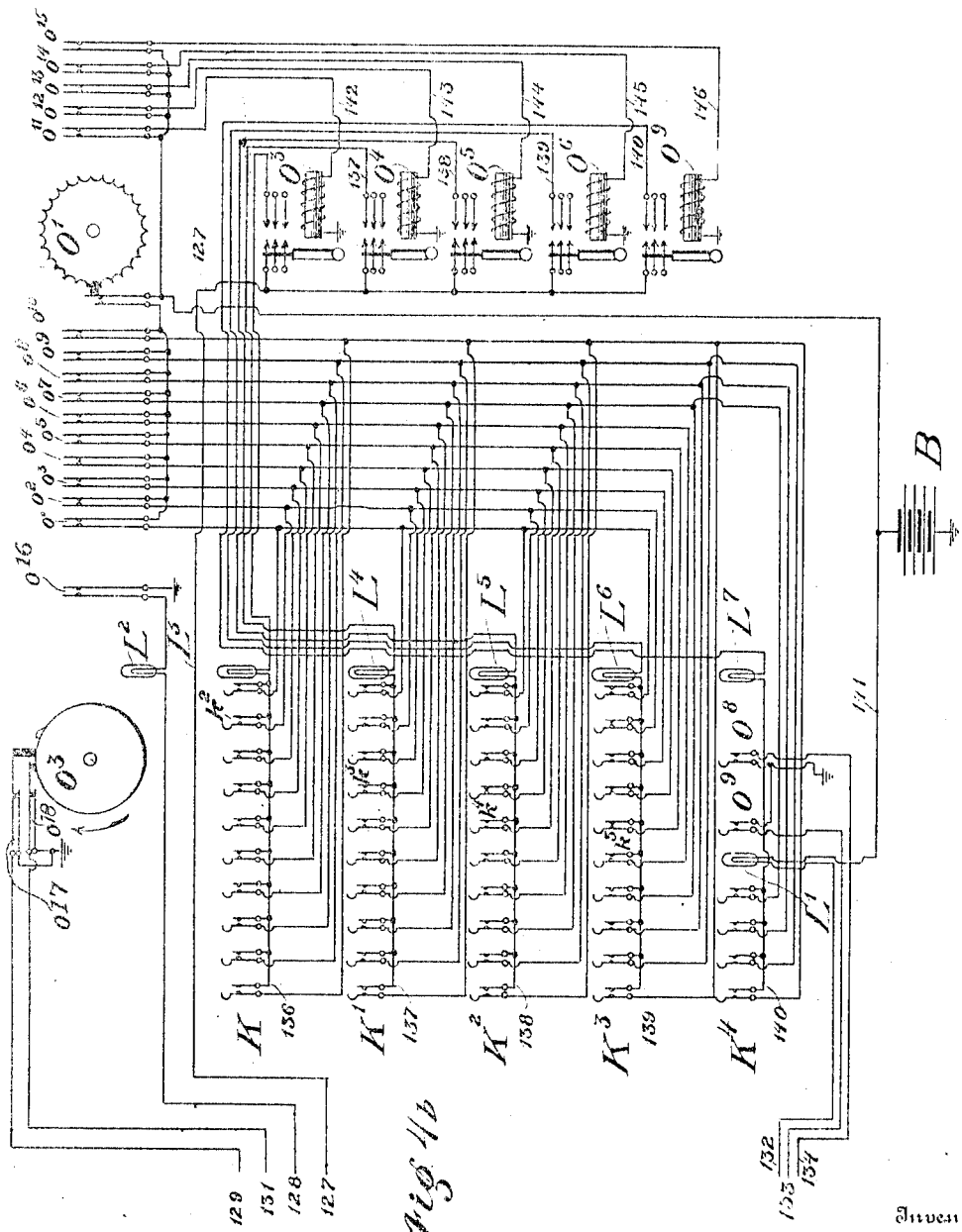

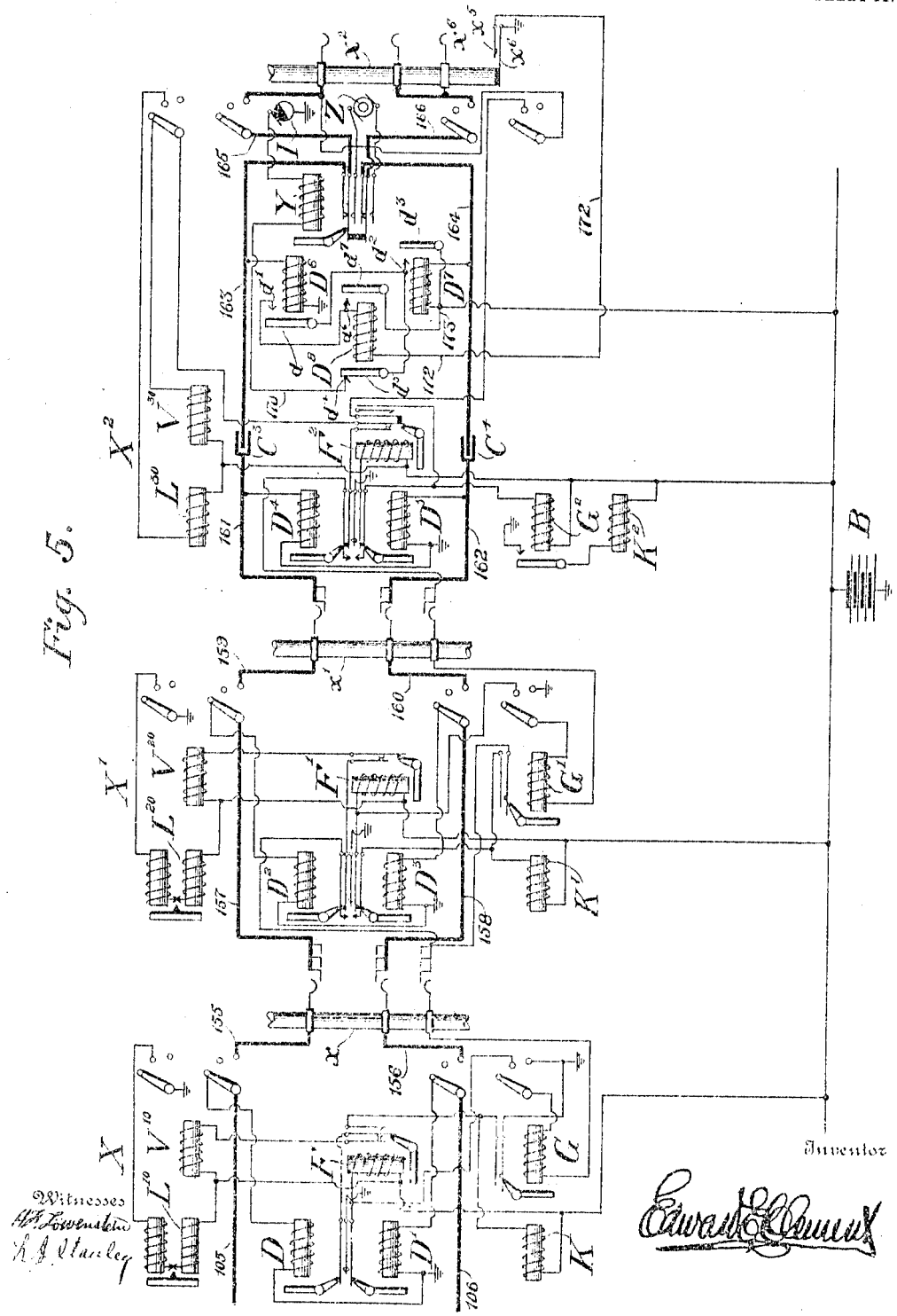

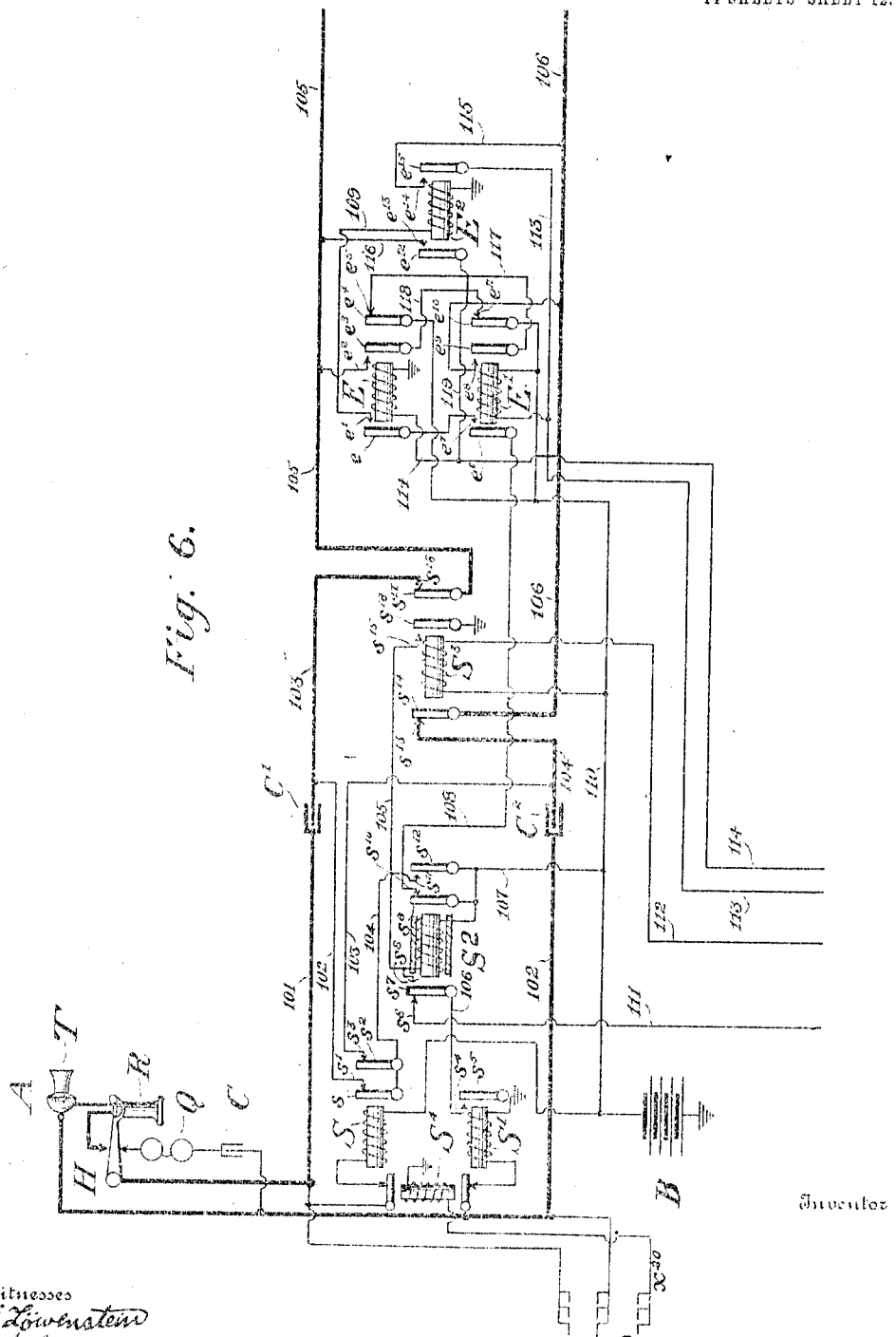

E. E. CLEMENT.
TELEPHONE EXCHANGE SYSTEM.
APPLICATION FILED APR. 23, 1908.
1,105,490.
Patented July 28, 1914.
14 SHEETS—SHEET 13.
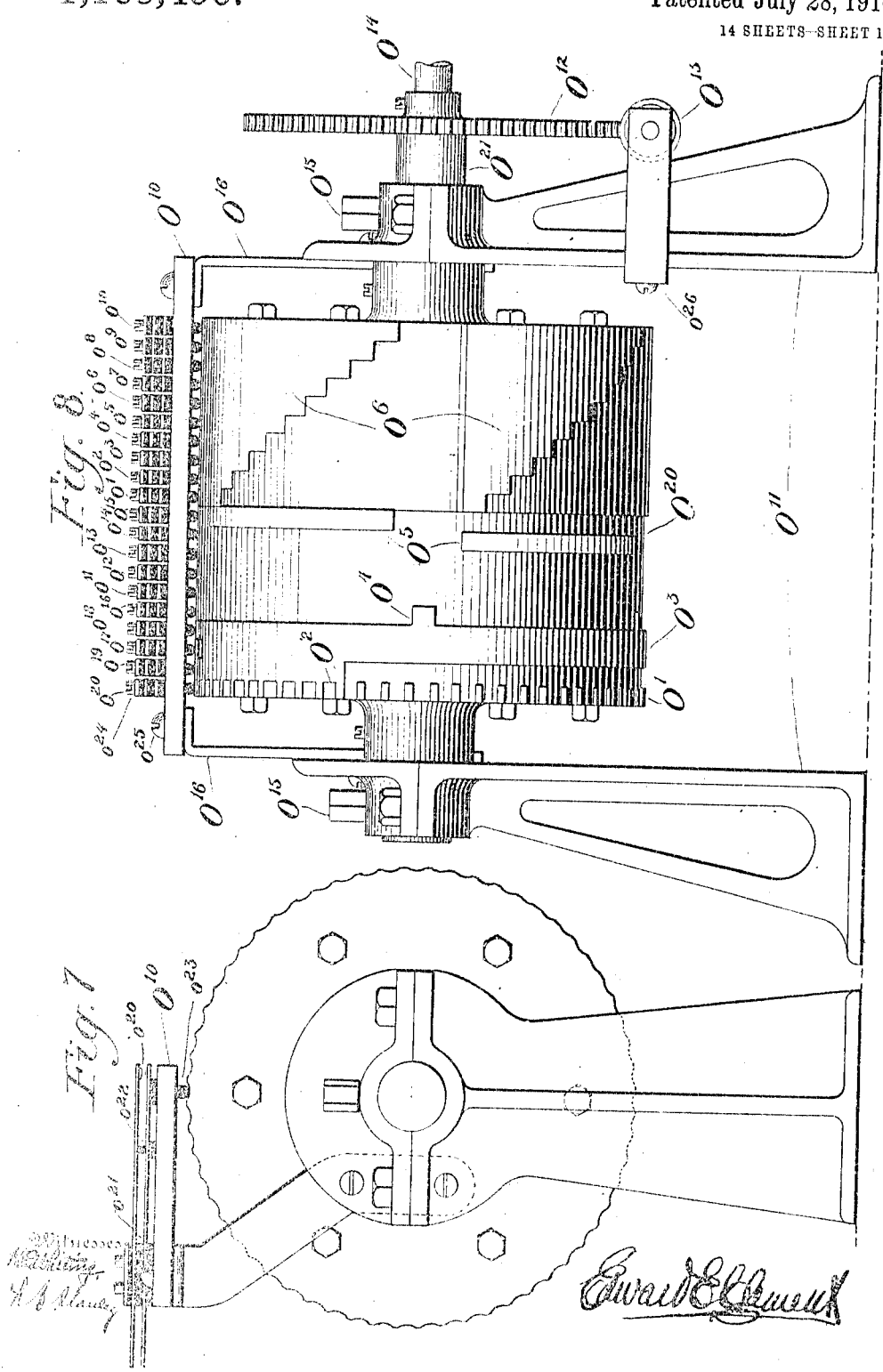

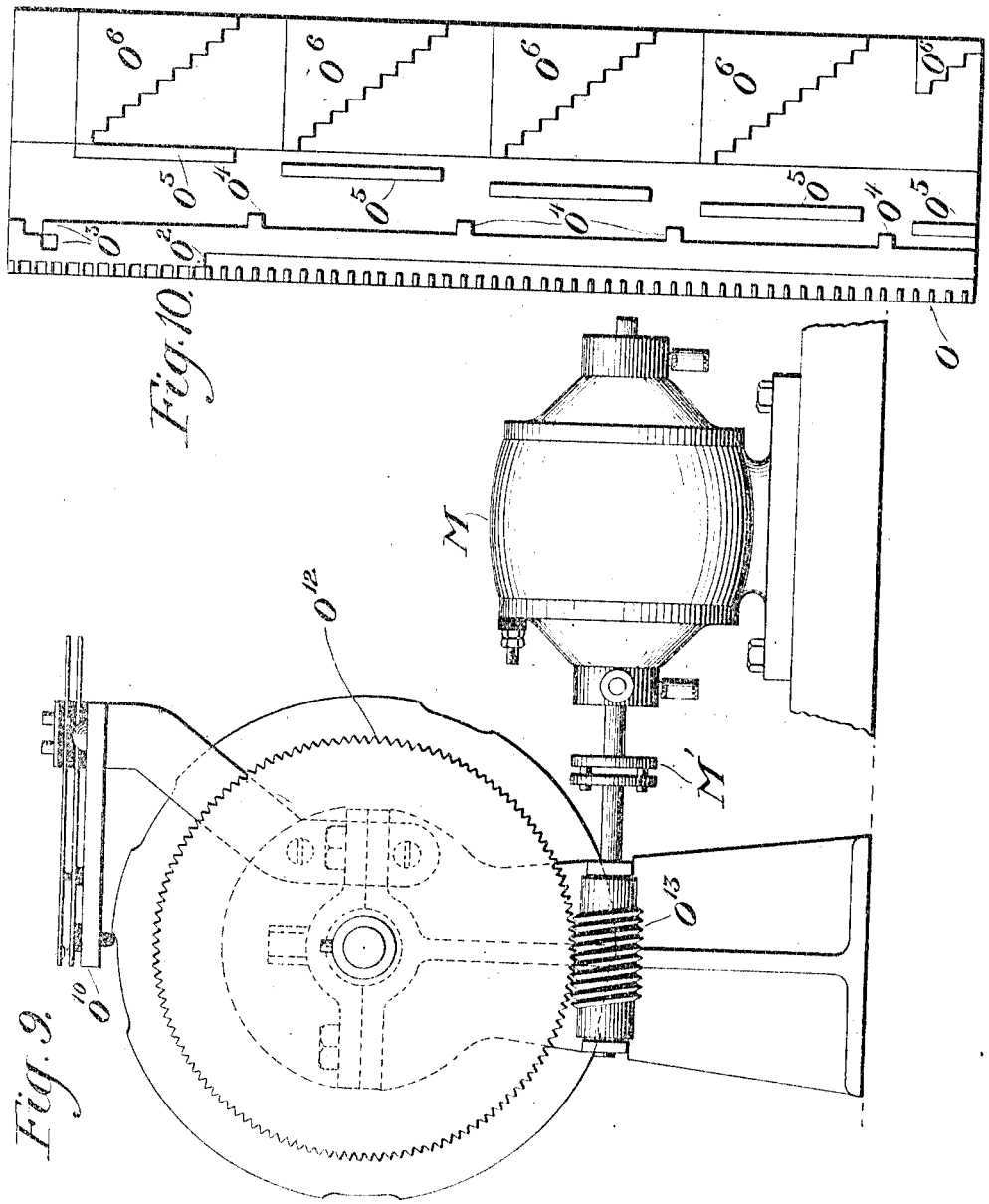

UNITED STATES PATENT OFFICE.

EDWARD E. CLEMENT, OF WASHINGTON, DISTRICT OF COLUMBIA.

TELEPHONE-EXCHANGE SYSTEM.

1,105,490.

Specification of Letters Patent.

Patented July 28, 1914.

Original application filed November 26, 1906, Serial No. 345,167. Divided and this application filed April 22, 1908. Serial No. 428,865.

*To all whom it may concern:*

Be it known that I, EDWARD E. CLEMENT, a citizen of the United States, residing at Washington, in the District of Columbia, have invented certain new and useful Improvements in Telephone - Exchange Systems, of which the following is a specification, reference being had therein to the accompanying drawings.

My invention relates to telephone exchange systems and it consists in the combinations and arrangements herein described and claimed.

An object of my invention is to arrange in a semi-automatic telephone system employing connective trunks and automatic switches means by which an operator may send impulses over the connecting trunks for operating the automatic switches and more especially to provide a convenient system in which the operator can make a manual selection of any of a number of calling trunks and connect said calling trunks with her sending device preparatory to sending in the impulses for operating said automatic switches. To this end I have connected the various trunks of the exchange with terminal jacks or with keys or switches by which the operator can make the desired connection with the sending device. Associated with the jacks, keys or switches as the case may be, are signal lamps which inform the operator of the incoming call and also designate the particular trunk over which said call is coming. The operator on receiving the signal connects her sending set with the calling trunk, and after learning the number wanted sets up said number on her key set, presses the starting key and the numbers are sent in automatically to the switches in the connecting trunks for completing the connection of the talking circuit. This system has been fully disclosed in my co-pending application, Serial No. 345,167 filed Nov. 26, 1906 and the present application is a division of said co-pending application.

Figure 1:
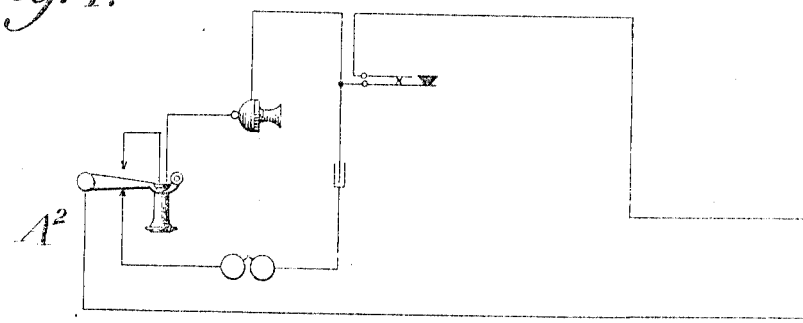
Figure 1:
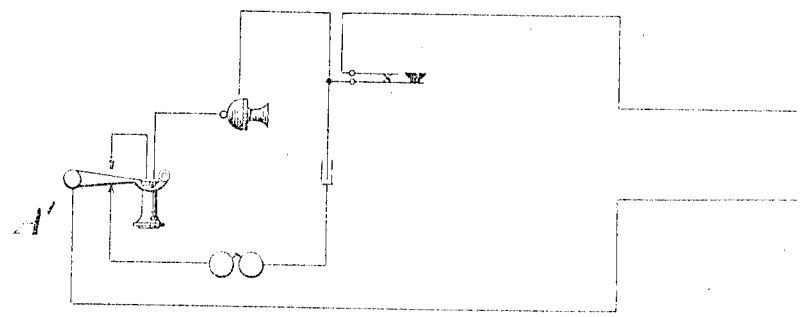
Figure 1:
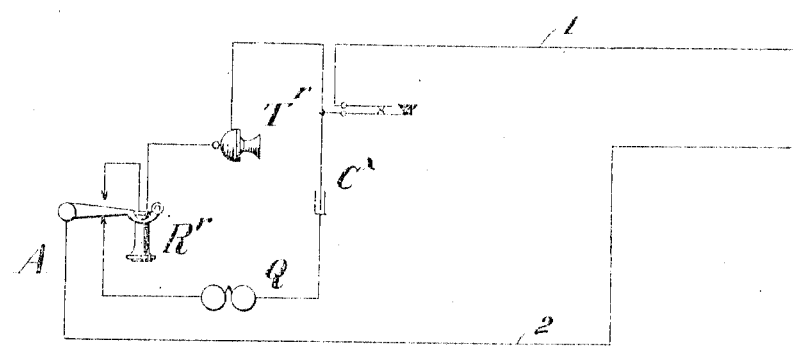
Figure 2:
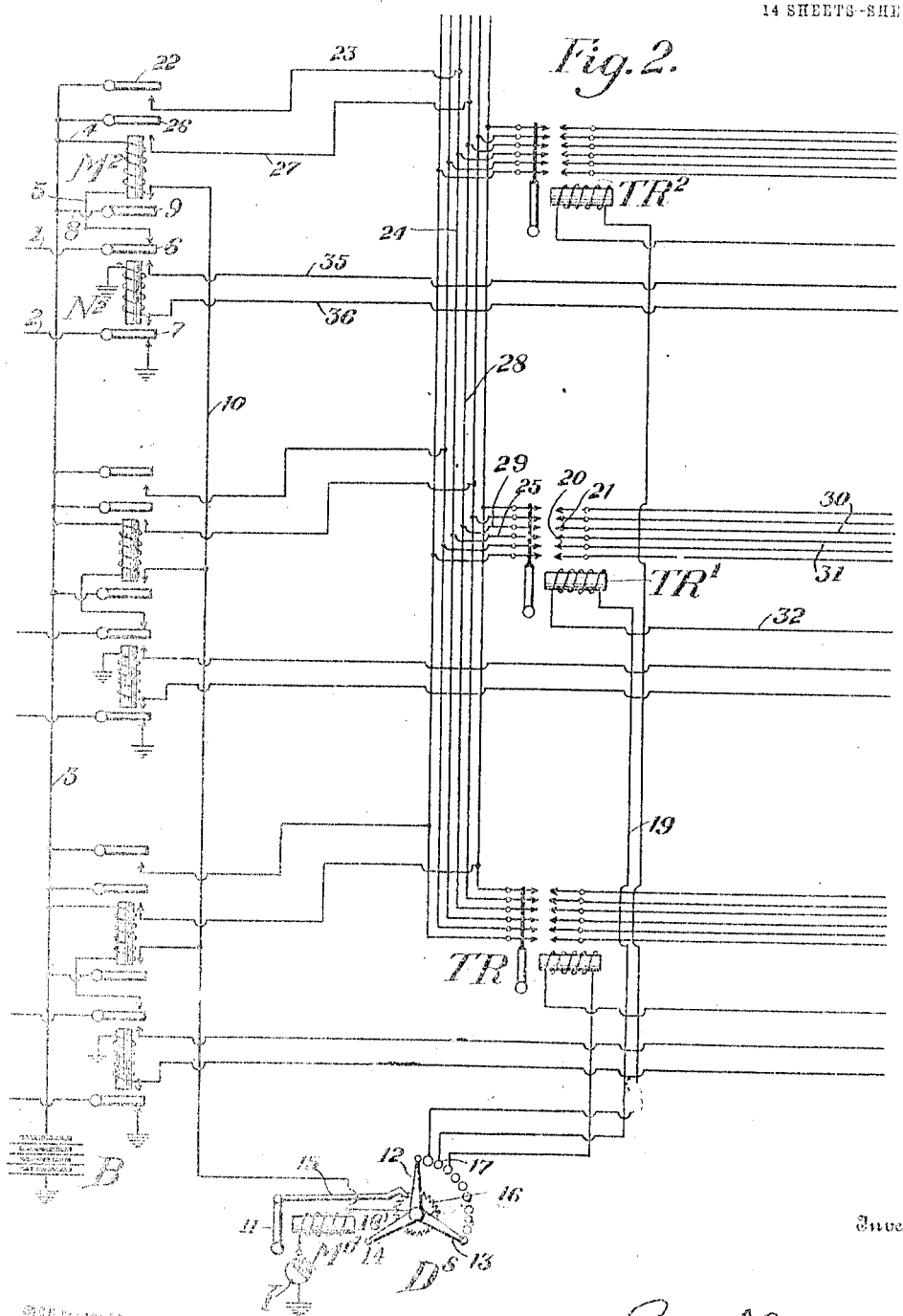
Figure 3:
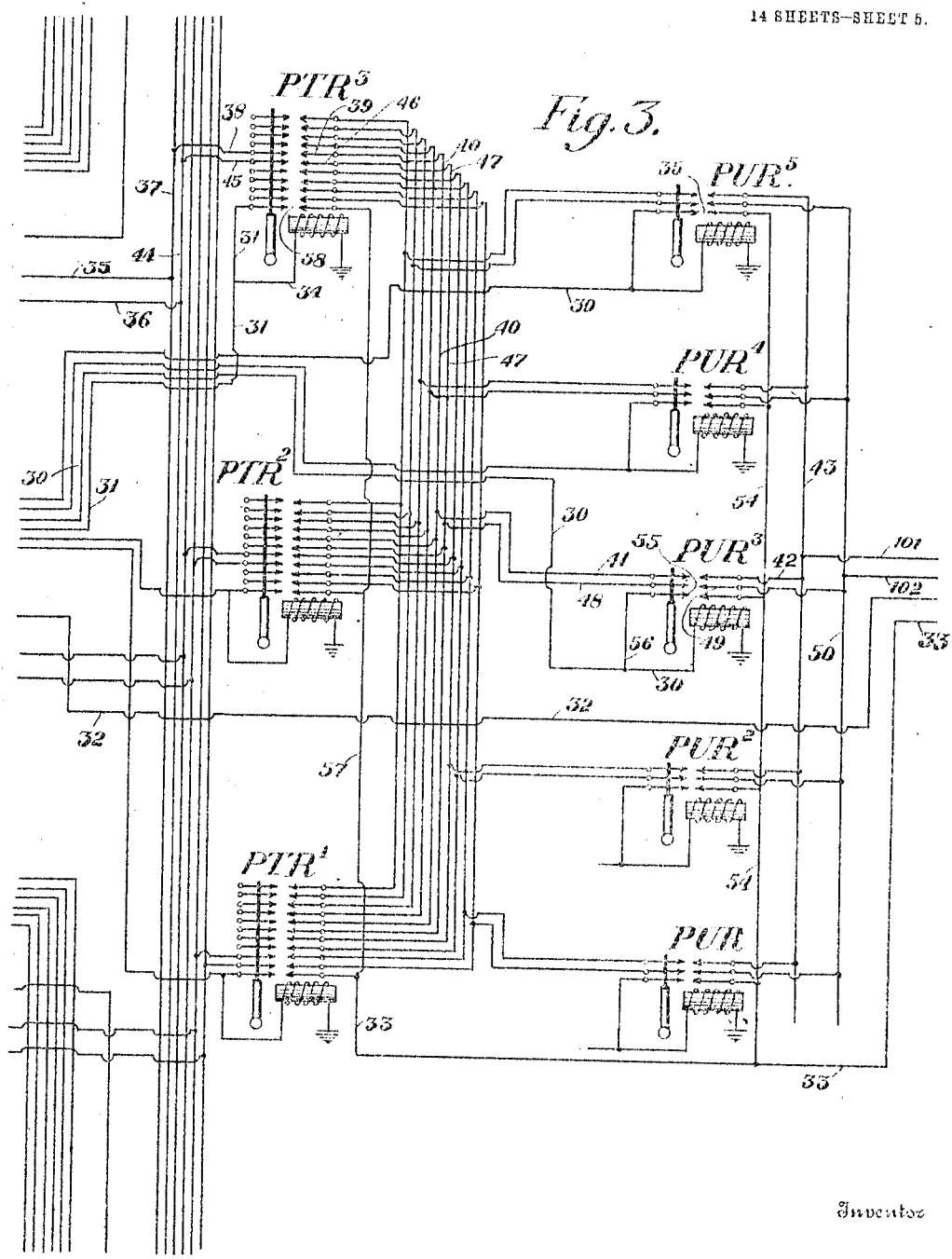

My invention is illustrated in the accompanying drawings in which:

Figure 1ª shows a subscriber's station, an automatic switch for connecting the same with a trunk line, and an operator's impulse sending device. Fig. 2ª is similar to Fig. 1ª but shows a modified form of means for connecting the trunk with the operator's sending device. Fig. 1 shows three subscribers' substations. Fig. 2 shows the central office terminals of three lines, trunk distributing relays and a distributing switch. Figs. 3, 3ª and 3ᵇ show a modified form of selecting means comprising relay primary selectors embracing portions of the tens and units relays of three trunks. Fig. 4 shows a first selector trunk. Fig. 4ª shows a jack and signal lamp which are parts of the first selector trunk. The connective apparatus for controlling the sending means outfit is also shown. Fig. 4ᵇ shows an operator's key set and also a modification of the sending machine circuit. Fig. 5 shows a first and second selector switch and a connector switch of the Strowger type. Fig. 6 is a modification of Figs. 1, 2, 3, 3ª, 3ᵇ and 4, and shows the subscriber's line terminating directly on a first selector trunk. Fig. 7 is an end view of the mechanical sending machine. Fig. 8 is a front view of the sending machine. Fig. 9 is an end view showing the motor attachment for driving machine. Fig. 10 shows the development of the surface of the drum.

Referring at first particularly to Fig. 1ª, the subscriber's station A' is connected by the line wires 1a and 2a to the armatures na and n'a of the cut-off relay Na which are normally connected through their back contacts to ground and to one terminal of the line relay M, the other terminal of the line relay being connected to the free side of the battery B through the wire 3a. The armature ma of the line relay is connected to battery and its front contact is connected with a switch arm 4a normally connected with the multiple test contacts 5a in a plurality of primary selector switches. The primary selector switches also have multiple contacts 6a and 7a to which the extensions 8a and 9a of the subscriber's line are connected. The switch comprising the arm 4a is one of a gang by which the subscriber's line may be shifted from one set of primary selectors to another, whereby the flexibility of the apparatus of an exchange is enhanced and the load may be equalized between different sets of primary selector switches. This shifting switch, however, forms no part of the present invention and will not be further described. Each of the primary selector switches may be the same as the switch Sa shown. This switch comprises a shaft sa to which are fixed the wipers 10a, 11a, and 12a adapted to engage respectively with the bank contacts 5a, 6a and 7a of the switch. The shaft sa has splined upon it a clutch member s'a adapted to be moved into and out of engagement with a clutch member ta fixed upon a shaft t'a continuously driven by suitable means as a belt ba actuated from any convenient source of power. The end of a lever la adapted to be attracted by the magnet Oa enters a groove in the clutch member s'a so that it may move that member axially of the shaft sa and will not interfere with its rotary movement. The clutch member s'a has teeth ca adapted to engage the stationary stop da to securely hold the shaft sa in any contacting position at which it may stop on the disengagement of the clutch. A retracting spring ea normally holds the clutch members in engagement. The test relay Ra has one terminal connected with the ground and the other with the test wiper 10a so when that wiper engages a contact which is on battery, the relay is energized. This relay initially controls the trunk cut-off relay R'a, the latter relay being later controlled jointly by the tip relay R²a and the relay R⁴a and still later the control is shifted from the relay R⁴a to the relay R³a. The relay R'a controls the clutch magnet Oa, at first jointly with the relay R⁴a and later, when the control is shifted from the relay just referred to, the relay R³a, the latter exerts a joint control with the relay R'a over the clutch magnet. From the wipers 11a, 12a of the primary selector switch extend the trunk extensions 13a and 14a, respectively, the said extensions terminating in front contacts of the armatures r'a and 2r'a of the relay R'a, the armatures referred to being respectively connected to the trunk sections 16a and 15a which are separated from the trunk conductors 17a and 18a, respectively, by the condensers Ca. These condensers, as is well known, are for the purpose of breaking metallic connections between the two ends of the trunk conductors so that confusion of currents supplied to the two ends is prevented and at the same time talking current is transmitted. The trunk conductors 17a and 18a are respectively connected with their extensions 19a and 20a by means of contacts in a key Ka which is adapted to connect and disconnect the trunk conductors and the extensions, which extensions are respectively connected to the conductors 105 and 106 of Fig. 5, which lead to the automatic Strowger switches as hereinafter described. An operator's telephone K'a comprising the usual features may be connected by means of a listening key K²a and conductors 21a and 22a with the trunk conductors 17a and 18a, from which it will be seen that when a trunk has been connected by a primary selector switch with a subscriber's line, and the listening key has been depressed, the operator's set will be placed in conversational connection with the calling subscriber. A lamp La, controlled by the relays R⁴a and R³a, advises the operator of the connection of a calling line with the trunk wires. A second lamp L'a controlled by the impulse sending machine advises the operator as to the operation of that machine. In addition to its function of controlling the connections between the conductors 17a and 18a with the conductors 105 and 106, respectively, the cam key Ka also serves to connect and disconnect the impulse sending machine with the conductors 105 and 106. The impulse sending machine of this figure comprises the number wheel Wa, the actuating handle Ha, the short circuiting fins s²a, s³a, s⁴a and s⁵a adapted to engage with the stems of push buttons P'a, P²a, P³a and P⁴a. A repeating relay R⁵a is also provided.

The operation of the system just described is as follows: Upon the removal of the receiver from its hook at a subscriber's station as A', the line wires 1a and 2a are connected together through the subscriber's telephone, when a circuit may be traced from the ground through armature na, conductor 2a, conductor 1a, armature n'a and line relay M to battery. The line relay being thus energized, its armature is attracted against its back contact thereby connecting the multiple test contacts 5a to battery through switch arm 4a. When the test wiper of a continuously rotating primary selector switch as Sa engages with a test conductor connected with battery as described, circuit may be traced from the battery wire 3a through the armature ma, switch arm 4a, contact 5a, wiper 10a and relay Ra to ground. The armature ra will then be attracted, when circuit may be traced from the battery wire 3a through conductor 21a, armature ra, conductor 22a, conductor 23a, and relay R'a to ground. The relay R'a then attracts its armatures, the armatures r'a and 2r'a connecting the conductors 13a and 14a with the conductors 15a and 16a respectively, while the armature 1r'a connects the clutch magnet Oa to the point xa, connection between that point and the ground being through conductors 25a, armature 1r'a, conductor 24a and magnet Oa. From the point xa circuit may also be traced through the armature r³a to battery when the relay R³a is energized. At the same time that the test wiper 10a rests upon a test contact 5a the wipers 11a and 12a will respectively rest upon the corresponding contacts 6a and 7a. Circuit may then be traced from the battery wire 3a through the conductor 29a.

sleeve relay R³a, trunk conductor 16a, armature R'a, extension 14a, wiper 12a, bank contacts 7a, line extension 9a and cut-off relay N to ground. The relays R³a and N will thus be connected in series between the free side of the battery and ground and will, therefore, be energized. The relay R³a will then attract its armature r³a which will come against its front contact and thereby connect the point xa with the conductor 29a. Since the conductor 29a is connected with the free side of battery, the point xa will be connected to battery and circuits, as before traced, will be made from this point to ground in one direction through the conductor 26a, armature 1r'a, conductor 27a and the lamp La and in the other direction to ground through the clutch magnet Oa, the clutch magnet and the lamp being connected in parallel branches. Circuits being as traced, the clutch magnet will be energized and, attracting the lever 1a, will disengage the clutch members thereby disconnecting the switch spindle sa from its driving means whereupon the switch will stop. The cut-off relay N being also energized will attract its armature when circuit may be traced from the line conductor 1a through the armature n'a, extension 8a, contact 6a, wiper 11a, extension 13a and armature 2r'a to trunk conductor 15a and from subscriber's line wire 2a through armature na, line extension 9a, contact 7a, wiper 12a, extension 14a and armature r'a to trunk conductor 16a. It will now be apparent that the subscriber's instrument is connected with the trunk conductors and that the operator has been apprised of such connection by the lighting of the lamp La by reason of the circuit through it as before traced. It will also be seen that when the armature n'a is attracted away from its back contact that the circuit of the line relay M is broken whereupon the armature ma falls away from its contact, thereby removing battery connection from the multiple test contacts 5a. Test wipers, of other switches, therefore, coming in contact with any of these multiple contacts will not be stopped as no circuit through their test relay Ra will be formed. The closing of the circuit through the subscriber's instrument from the trunk conductor 15a and the conductor 16a, as had already been traced, operates to bridge the tip relay R²a and sleeve relay R³a between the free side of battery on one hand and the ground on the other. The relay R²a thereupon becomes energized and attracts its armature r²a against its front contact thereby establishing a battery connection for the relay R²a to maintain that connection which is broken at the armature ra when battery is removed from the test contact 5a. This latter connection may be traced from the conductor 23a through conductor 30a, armature r²a, conductor 31a, armature r²a and conductor 29a to the battery wire 3a. The operator having been apprised of the connection of the subscriber's instrument to the trunk, she depresses the listening key K²a whereupon the operator's telephone K'a is connected with the trunk conductors 17a and 18a through the conductors 21a and 22a which have been before referred to. The operator being now in conversational communication with the subscriber can ascertain the number of the wanted subscriber and, having accomplished this, the key Ka is depressed. In the raised positions of the key the trunk conductors 17a and 18a are respectively connected with the extensions 105 and 106 through the contacts 32a, 33a, 34a and 35a. When this key is depressed the contacts are separated so as to disconnect the conductors 17a and 18a from the conductors 105 and 106, while the conductors 36a and 37a leading to the impulse sending machine and which are respectively connected to the contacts 38a and 39a are connected with the conductors 19a and 20a by reason of the contacts 34a and 32a coming into engagement with the contacts 38a and 39a respectively. The depression of the key Ka also causes the engagement of the contacts 40a and 41a, thereby connecting the battery wire 29a with the conductor 42a which leads to one terminal of the relay R⁴a, the other terminal of that relay being grounded. This results in the energization of the relay last referred to, whereupon its armatures are attracted, the armature r⁴a connecting one terminal of its relay with the battery connected wire 26a, whereupon the connection through that relay is locked, being controlled by the relay R³a. The attraction of the armature 1r⁴a breaks the circuit of the lamp La. The connection of the sending machine with the conductors 105 and 106 having been made as described, the operator sets the push buttons of the sets P'a, P²a, etc., to correspond to the number of the wanted subscriber and then actuates the handle Ha whereupon the impulses are transmitted to the conductors 105 and 106 respectively and thence to the automatic Strowger switches, all as hereinafter described. In moving the handle Ha from its initial position conductors 43a and 44a, which are normally held apart by that handle, are permitted to come together as is their constant tendency. One of these conductors is connected, through the conductors 45a and 46a, with the battery wire 3a while the other of these conductors is connected by the conductor 46a with one terminal of the lamp L'a, the other terminal of that lamp being connected to a grounded conductor 28a. It will thus be seen that normally the circuit through the lamp L'a is broken at the contacts 43a and 44a but on setting the handle Ha to transmit signaling impulses, the circuit of this lamp becomes complete and it is lighted. This condition continues until the sending of the impulses has been finished and the handle Ha has returned to its normal position, when the circuit of the lamp is again broken. The lighting and the extinguishment of this lamp, therefore, advises the operator of the starting and stopping of the impulse sending device. Upon the completion of the sending of the impulses, the operator lifts the key Ka thereupon disconnecting the contacts 32a and 34a from the contacts 39a and 38a respectively, and brings them into engagement with the contacts 33a and 35a respectively, thus disconnecting the sending machine and connecting the trunk conductors 17a and 18a with the conductors 105 and 106 respectively from which circuit can be traced through the Strowger switches to the called subscriber, as hereinafter described. The lifting of the key Ka also results in the separation of the contacts 40a and 41a thereby breaking the battery connection, through those contacts, of the relay $R^4a$; but it will be remembered that the battery connection of this relay is now formed through the armature $r^4a$.

The operation of the automatic switches in the completion of the talking circuit will be described in detail in the explanation of the operation of a modified form of the operator's impulse sending machine the actuation of the switches being accomplished in the same manner with both of the sending devices. For the present we will assume that the completed connections have been made. Conversation may now be carried on between the called and calling subscribers, and upon the termination of the conversation and the hanging up of the calling subscriber's receiver, the following operations take place: The hanging up of the receiver breaks the connection between the subscriber's lines 1a and 2a whereupon the circuit of the tip relay $R^2a$ is broken and its armature is released. This opens the circuit of the relay $R'a$ which in turn releases its armatures. The releasing of the armatures last named effects two results simultaneously. One is the breaking of the connections between the extensions 13a and 14a with the trunk conductors 15a and 16a respectively whereupon the circuit through the cut-off relay N and the sleeve relay $R^3a$ is broken and their armatures are released. The other result referred to is the breaking of the circuit of the clutch magnet Oa at the armature $1r'a$, whereupon the spring ea moves the clutch members into engagement and the switch Sa starts into rotation. The deënergization of the sleeve relay $R^3a$ and the consequent retraction of its armature $r^3a$ results in the breaking of the battery connection of the relay $R^4a$ whereupon its armatures are released. The deënergization of the tip relay $R^2a$ while the relay $R^4a$ is energized, operates to throw battery simultaneously upon the two sides of the trunk through the armatures rax and $r^4ax$ whereupon the Strowger switches are restored in a well known manner. The apparatus is now in its normal unconnected condition and is in readiness to serve calling subscribers.

Referring to Fig. 2ª, there is therein shown apparatus similar to that shown in Fig. 1ª but differing therefrom in some important particulars. The apparatus comprises a subscriber's telephone set A', a cut-off relay N, a line relay M, a continually rotating switch Sa, a clutch magnet Oa, a test relay Ra and relays $R'a$, $R^2a$, $R^3a$ and $R^4a$, together with relay armatures and trunk and line conductors all as shown and described in connection with Fig. 1ª. The apparatus of Fig. 2ª also comprises an impulse sending machine comprising a number wheel Wa and its actuating handle Ha, sets of push buttons $P'a$, $P^2a$, $P^3a$ and $P^4a$, the short-circuiting fins $s^2a$, $s^3a$, $s^4a$ and $s^5a$, and the impulse repeating relay $R^5a$, from which it will be seen that this impulse sending machine is like that shown and described in connection with Fig. 1ª and which was described earlier in the specification. The operator's telephone set K'a is of well known construction.

While the apparatus of Fig. 2ª is like that of Fig. 1ª, the apparatus for connecting the operator's telephone and the impulse machine with the trunk conductors is materially different from that corresponding apparatus of Fig. 1ª. This apparatus and its manner of operation will now be described.

On reference to Fig. 2ª it will be seen that the means for connecting the impulse sending machine and the operator's telephone with the trunk conductors, consists in a twin plug structure which consists of a base or block 1b in which are mounted plugs 2b and 3b each having a tip and sleeve insulated from each other in the usual manner. One of these plugs 2b serves to connect the operator's telephone, having one of the conductors 4b of that telephone connected with its tip while the other operator's telephone conductor 5b is connected with the sleeve. The other plug 3b, serves to connect the impulse sending machine, having one of the conductors 6b from that machine connected with the sleeve of the plug, while the other conductor 7b from the sending machine is connected with the tip of the plug. The plugs 2b and 3b being mounted as described, are adapted to be inserted simultaneously in their respective jacks. The jack corresponding to the plug 2b comprises contact springs 8b and 9b which are adapted to engage respectively with the tip and sleeve of the plug and are respectively connected with the trunk conductors 17a and 18a. Also mounted at the jack and adapted to be closed by the insertion of the plug 2b, are normally open contacts 10b and 11b one of which is connected with the battery wire 25a while the other is connected with one terminal of the relay R'a. The jack which receives the plug 3b comprises springs 12b and 13b adapted to engage with the tip and sleeve respectively of the plug 3b, when that plug is inserted, and which are respectively connected with the trunk extensions 19a and 20a. This last jack also comprises contacts 14b and 15b which are respectively connected to the trunk conductors 17a and 18a, and are normally in contact with the springs 12b and 13b respectively but which are separated therefrom upon the insertion of the plug. The apparatus also comprises signal lamps La and L'a for purposes as set forth in connection with Fig. 1ª. A subscriber's station A' being connected with the trunk conductors and the lamp La lighted as described in connection with Fig. 1ª, the operator, being apprised of the connection of the trunk by the lighting of the lamp referred to, inserts the twin plug 2b and 3b into their respective jacks. The plug 2b then connects the conductors 4b and 5b of the operator's telephone set with the jack contacts 8b and 9b respectively which are in turn respectively connected to the trunk conductors 18a and 17a. The operator's telephone set is then bridged across the trunk conductors and is in conversational connection with the subscriber's instrument. The insertion of the plug 2b also operates to bring the contacts 10b and 11b into engagement thereby closing a battery connection on one terminal of the relay R'a whereby that relay becomes energized and, when the armatures are attracted, a battery connection locked on the relay by its armature r'a. The insertion of the plug 3b operates to connect the conductors 7b and 8b leading to the impulse transmitting machine, respectively, to the jack contacts 12b and 13b which are respectively connected to the conductors 105 and 106. The impulse machine is thus connected to the conductors 105 and 106 leading to the Strowger switches as shown in Fig. 5. The contacts 12b and 13b tend to engage with the contacts 14b and 15b respectively and thereby to connect the trunk conductors 17a and 18a with the conductors 105 and 106 respectively. The insertion of the plug 3b however, moves the contacts 12b and 13b out of the engagement with the contacts 14b and 15b thereby breaking apart the connection between the conductors 17a and 105 on the one hand and the conductors 18a and 106 on the other. It will now be seen that, the twin plug having been inserted, the operator's telephone is connected in conversational communication with the calling subscriber, the contacts between the trunk conductors 17a and 18a and their respective extensions 105 and 106 have been broken, while the impulse sending machine has been placed in operative connection with the Strowger switches. The operator then ascertains from the calling subscriber the number of the station wanted and thereupon transmits the proper impulse to the Strowger switches in a manner hereinafter described. The wanted subscriber having been called, and the completion of the call being indicated by the extinguishment of the lamp L'a which is lighted during the operation of the sending machine, the operator removes the twin plug from the jacks whereby her telephone set is disconnected from the trunk conductors, as is also the sending machine, while the conductors 17a and 18a are respectively connected with the conductors 105 and 106 by the coming together of the contacts 12b and 13b and the contacts 14b and 15b respectively.

Figs. 1, 2, 3, 3ª and 3ᵇ illustrate a modified form of means by which a calling line may be automatically connected to an idle trunk. This arrangement has been fully described in my previous application Serial No. 283,875, filed July 15th, 1907, and I will only describe so much of it as will be necessary to show how such automatic selection and connection is made.

Referring now to Fig. 1, I have shown therein three subscribers' stations, A, A', and A² equipped with the usual telephone apparatus including a transmitter, receiver and ringer. The line wires 1 and 2 lead from the stations and terminate as shown in Fig. 2, in the contacts of the particular cut-off relays associated with the line.

Fig. 2 shows the central office terminal apparatus of three lines including the line and cut-off relays. Three trunk distributing relays TR, TR' and TR² are also shown, together with a distributing switch D arranged to be actuated by a magnet Md, when one of the line relays has pulled up.

Figs. 3, 3ª, and 3ᵇ show the primary selector tens and units relays of three different trunks. In these figures it is to be understood that the armatures of the tens relays are arranged to close eleven pairs of contacts while the armature of each of the units relays is arranged to close three pairs of contacts as will be hereinafter described. For every one hundred lines there are provided ten trunks. Each trunk has associated with it ten tens relays and ten units relays. Any one of the lines may have access to any trunk through the simultaneous operation of a tens and a units relay associated with the trunk and to which the calling line is connected. The multiple line connections to the tens and units relays are as follows:

The lines being numbered from 1 to 100 consecutively, line Number 1 is multipled to the first pair of contacts of the first tens relay each trunk. Line 2 is multipled to the second pair of contacts of the first tens relay in each trunk, line Number 3 to the third pair of contacts of the first tens relay of each trunk and so on up to line 11. Line 11 being in the second set of 10 lines, will be multipled to the first pair of contacts in the second tens relay of each trunk. Line 12 will be multipled to the second pair of contacts in the second tens relay of each trunk and so on. Line 56 being the sixth line of the fifth set of 10 lines will be multipled to the sixth pair of contacts in the fifth tens relay of each trunk. The contacts in the tens relays opposite those multipled directly to the lines referred to above, are connected directly with contacts in the units relays as follows: The first pair of contacts of each tens relay of a group of 10 associated with a particular trunk is connected with the contacts of the first units relay belonging to the trunk. The second pair of contacts of the same group of relays are all connected to the contacts of the second units relay belonging to the trunk, the third to the third relay and so on. The opposite contacts in the units relays of a particular trunk are all connected directly to the trunk. In Figs. 3, 3$^a$ and 3$^b$ the bottom contacts of all the tens and units relays serve to complete locking circuits for their respective relays. These three figures as has been stated show three tens relays and five units relays each of three separate trunks. In Fig. 3 the tens relays are designated as PTR', PTR$^2$ and PTR$^3$, the units relays as PUR', PUR$^2$, PUR$^3$, PUR$^4$, and PUR$^5$. In Fig. 3$^a$ the tens relays are 1PTR', 1PTR$^2$, 1PTR$^3$ and the units relays 1PUR', 1PUR$^2$, 1PUR$^3$, 1PUR$^4$ and 1PUR$^5$. In Fig. 3$^b$ the tens relays are 2PTR', 2PTR$^2$, and 2PTR$^3$, and the units relays 2PUR', 2PUR$^2$, 2PUR$^3$, 2PUR$^4$ and 2PUR$^5$.

The operation of connecting a calling subscriber with the trunk by means of the primary selector relays is as follows: We will assume that a subscriber at the station A$^2$ desires a connection. He removes his receiver from the hook thereby closing his line circuit 1—2 and energizing the line relay M$^2$ the energizing circuit being from battery B (see Fig. 2) through 3, 4, M$^2$, 5, 6, 1, through the subscriber's telephone, 2, 7 and ground. The pulling up of the line relay puts battery current onto the magnet Md of the distributing switch Ds, current flowing from battery through 3, 8, 9, 10, Md, interrupter I and ground. The actuation of the armature 11 of the magnet Md turns the arms 12, 13 and 14 of the distributing switch Ds through the medium of the pawl 15 connected to the armature 11 and the ratchet 16 of the distributing switch. The switch will continue to turn owing to the intermittent current through the interrupter until one of the arms 11, 12 and 13 comes onto a contact leading to one of the relays TR, TR' and TR$^2$ associated with an idle trunk. Let us assume that this is the relay TR'. When the arm 12 comes onto the terminal 17 the relay TR' is energized current flowing from battery B (see Fig. 2) through 3, 8, 9, 10, 18, 12, 17, 19, TR', 32, continuation of 32 (Fig. 3), continuation of 32 (Fig. 4), s$^5$ and ground. It will be observed that the selection of the idle trunk depends upon the de-energized condition of the sleeve relay S' of the idle trunk and that if the trunk were in use the armature s$^5$ would be drawn up and hence its associate transfer relay could not be energized. The actuation of the transfer relay shunts the magnet Md of the distributing switch Ds and the latter ceases to rotate. The pulling up of the trunk distributing relay TR' connects battery with the terminals 20, 21 the former being through the armature 22 of the line relay M$^2$, conductors 23, 24 and 25 while the latter is connected through armature 26 of the line relay M$^2$ and conductors 27, 28 and 29. The closing of the circuit at 21 energizes the units relay PUR$^3$, the energizing circuits of the relay PUR$^3$ being from battery up to 21 as traced and thence through conductor 30 in Figs. 2 and 3, through PUR$^3$ and to ground.

It will be understood that all of the units relays belonging to this group have their circuits partially closed through the closing of the contacts at the relay TR' but that the relay PUR$^3$ is the only one which has its circuit completed by the line relay M$^2$ as has also the proper tens relay to effect the connection of the calling line in question with the idle trunk. At the same time the tens relay PTR$^3$ is energized the energizing circuit continuing from the contact 20 through conductor 31 in Figs. 2 and 3, 34, PTR$^3$ and ground. Both of the relays PTR$^3$ and PUR$^3$ therefore pull up and close their respective contacts. The simultaneous closing of the contacts of the tens relay PTR$^3$ and of the units relay PUR$^3$ connects the extensions 35 and 36 of the line wires 1 and 2 to the trunk conductors 101 and 102 respectively the former connection being traced from wire 35 in Figs. 2 and 3, through wire 37, 38, contact 39, conductor 40, 41, 42, 43, 101, and the latter being from wire 36 in Figs. 2 and 3, through 44, 45, 46, 47, 48, 49, 50, 102. The connections of the trunk 101 and 102 with the extensions 35 and 36 of the line wires 1 and 2 results in the energization of the cut-off relay N$^2$ current flowing from battery (see Fig. 4) through 51, 52, S', 53, trunk 102, back over the conductor 36 as already traced and to ground through the cut-off relay N$^2$. Thereupon the cut-off relay pulls up and breaks the circuit of the line relay M² causing the latter to retract and at the same time closing the line wires 1 and 2 onto the extensions 35, 36, through the armatures 6 and 7. The connection of the trunk with the line circuit causes the actuation of the tip relay S in series with the sleeve relay S'. The actuation of the armature s²⁰ of the relay S completes a locking circuit for both the tens and units relays said circuit being traced from battery in Fig. 4 through 13, s², s²¹, wire 33 in Figs. 4 and 3, wire 54, contacts 55 of the units relay PUR³, 56, 30, PUR³ and ground, and through wire 57 and contacts 58 of the tens relay PTR³, conductor 31, 24 and ground.

Having thus described the manner in which a calling subscriber is connected to an idle trunk I will explain the construction and operation of a modified form of operator's sending device adapted to coöperate with the primary connecting means and will also describe the completion of the circuit by means of the automatic switches.

Referring to Figs. 7 and 8, the drum of the sending machine revolves on the shaft O²¹ which is supported by the two end brackets O¹¹. One end of the shaft is reduced as shown at O¹⁴ and is fitted with a wheel O¹² which is engaged by the worm O¹³. This worm in turn is fastened to one of the brackets O¹¹ by means of the yoke o²⁵. The motor for driving the drum, as shown in Fig. 9 is connected directly to the shaft by means of the coupling M'. The motor can be of any standard type and of any speed, for the worm gear can be so proportioned to drive the drum at any predetermined rate of speed. The drum in making one revolution sends one complete set of impulses to operate the first and second selectors and connector switches, so it follows that the speed of the drum is to be regulated entirely by the speed in which the switches will respond to the impulses.

Fig. 7 shows the common commutator O' which makes and breaks the contacts o²⁰ for furnishing impulses for operating the various switches. These contact springs, as well as the others shown in Fig. 8, are mounted on a common plate O¹⁶, which is supported by the brackets O¹¹ which are fastened to the braces O¹⁹. These springs are mounted and arranged in the manner of standard relay springs. Each set of springs is separated by insulating material O²³ and held in place by means of screws o²⁴. Each set of springs, besides being provided with a small bushing o²³ to keep the contact springs spaced uniformly, is also provided with a plunger o²², which passes through the piece O¹⁰ and engages the various cams. The drum in revolving, of course lifts the plungers up and down, thus making and breaking the contact springs o²⁰. The surface of the drum, as shown in Figs. 8, 9 and 10 is divided up into several zones, each zone containing a cam or cams for working the various springs shown in Fig. 8 and which are shown diagrammatically in Fig. 4ᵇ. The cams on the zone O' as already described, operate the contact springs o²⁰ which form the interrupter for operating the various switches. The zone O² contains a cam for operating the ringing relay in the connector switches. The zone O³ contains two cams for operating contacts o¹⁷ and o¹⁸ for controlling the relays shown in Fig. 4ᵃ. The zone O⁴ contains a cam for sending rotary impulses for operating the side switches in the various selector and connector switches. The zone O⁵ contains the cams which operate the contacts o¹¹, o¹², o¹³, o¹⁴ and o¹⁵ for controlling the relays shown in Fig. 4ᵇ. The zone O⁶ contains cams for operating the ten sets of springs o' to o¹⁰ which in connection with contacts o²⁰ operate the various switches. The cam on the zone O⁶, which operates the contacts o' is the shortest and the cam which operates the contacts o¹⁰ is the longest, while the cams which operate the intermediate springs vary in length. By referring to Figs. 4ᵇ and 10, it will be seen that the cam which operates the contacts o' will keep the contacts closed, while one impulse or make and break is being transmitted by means of the contact springs o²⁰. By referring to Fig. 4ᵇ it is shown that one of the springs o²⁰ is connected directly to battery while the other spring is connected in common to one spring of each set from o' to o¹⁰. By referring to Figs. 8 and 10, it will be noticed that the contacts o' are closed just before the contacts o²⁰ are made and are kept closed until after the contacts o²⁰ are broken. Contacts o² which are controlled by the next length cam will receive two impulses from the contacts o²⁰ and so up to contacts o¹⁰ which by means of the longest cam will receive ten impulses in a like manner. This method of keeping the contacts which are operated by cams in zone O⁶ closed while the contacts in o²⁰ are being opened and closed is employed so as to avoid sparking between this set of contacts. All of the sparking is done at the common contacts o²⁰ which can be made heavy and substantial enough to last indefinitely and also have carrying capacity for a large quantity of current.

Referring now to Fig. 4ᵇ, it will be seen that I have shown five strips of keys or buttons. These buttons can be of any standard make such as are used in selective party line work, that is, each button when depressed must stay locked and keep its contact springs closed and when another key in the same row is depressed, it must release the preceding key and remain locked itself.

All of these buttons are of this type with the exception of two buttons $O^8$ and $O^9$ shown in the strip $K^4$. These two buttons which are respectively the listening and starting buttons, do not lock when depressed, but at once return to their normal position. The lamp $L'$, as shown in the strip $K^4$ is a guard lamp and remains lighted while a call is being transmitted and is controlled by the relay $T^3$ in Fig. 4ª. The lamps $L^2$ to $L^7$ are simply resistance lamps, one being placed in a common wire of each strip of keys and one in series with a rotary wire for protection against short circuiting. In place of these lamps an ordinary resistance coil can be used. The strip of keys K represents and controls the impulses corresponding to the thousands numerals, the strip $K'$ represents the hundreds, the strip $K^2$ the tens, while the strip $K^3$ represents the units. The four buttons in the strip $K^4$ control the impulses for selective ringing for party lines, but in this case they will not be used, as selective ringing is not employed.

By referring to Fig. 10, it will be noticed that there are five groups of cams, one group representing the thousands, one the hundreds, one the tens, one the units and one for party line ringing. In the zone $O^5$ it will be noticed that there is one cam in line with each set of cams in zone $O^6$. While the first set of cams, counting from the top are operating the contact springs $o'$ to $o^{10}$, the relay $O^3$, Fig. 4ᵇ, has its circuit closed by the closure of the contacts $o^{11}$, thereby connecting the common vertical wire 127 to the common wire 136 of the strip of keys K. While the set of springs $o'$, $o^{10}$ are being operated by the second set of cams in the zone $O^6$, the second relay $O^4$ is energized by the closure of the contacts $o^{12}$, thereby connecting the common vertical wire 127 to the common wire 137 of the strip of keys $K'$. This operation is repeated in regular order, transferring the common vertical wire first to one strip of keys, then another. Between each of these transfer points one rotary impulse is sent out over the common rotary wire 128 by the closure of the contacts $o^{16}$.

Referring now to Figs. 4ª and 4ᵇ, it will be shown how a set of impulses are started and how they are stopped after one complete set have been transmitted. Referring to Fig. 4ᵇ, the operator sets up the buttons corresponding to the number desired and then depresses the starting button $O^9$. This button has already been described as non-locking and when depressed closes the circuit of the relay $T^2$ of the Fig. 4ª, which in turn closes the circuit of the relay $T^3$. The relay $T^2$ is held energized through the contacts $o^{17}$, while the relay $T^3$ is kept energized by the relay $T^2$ and also through the contacts $o^{18}$. The drum or sending machine is supposed to be running in the direction shown by the arrow in Fig. 4ᵇ and as soon as the cam in zone $O^5$ reaches the plunger and opens the contact $o^{17}$ the relay $T^2$ becomes deënergized, but the relay $T^3$ remains energized. The cams on the zone $O^5$ are really the starting or home points of the machine as soon as the relay $T^2$ falls back, as all impulses start from this certain point. The set of contacts $o'$ and $o^{10}$ are now operated and also relay $O^3$ which connects the vertical wire 127 to the first strip of keys K. One spring of the set of contact springs $o'$ is connected in multiple to the first key in each strip; one contact of the second set $o^2$ is connected to the second key of each strip and this operation is continued until one spring of each set is connected to a corresponding key in each strip. After the relay $T^2$ falls back, the impulses corresponding to the thousands numeral is transmitted from a set of springs in a group $o'$ to $o^{10}$ through the key which has been depressed in the strip K to wire 136, resistance lamp $L^3$, contacts of the relay $O^3$, wire 127, contacts $t$, $t'$ of the relay $T^2$, 125, $t^9$, $t^8$ to trunk wire 120. After the proper thousands numeral has been transmitted a single impulse is sent over the wire 128 by the closing of the contacts $o^{16}$, through the contacts $t^2$ and $t^3$ of the relay $T^2$, 126, $t^{10}$, $t^{11}$, 121 and to the trunk wire. After this single rotary impulse, the group of contacts $o'$ to $o^{10}$ are operated a second time and now by means of the relay $O^4$, the impulses are transferred over the vertical wire 127 through whichever key has been depressed in the strip $K'$. After the second group of impulses has been transmitted, there follows a second impulse over the wire 128 by the closing of the springs $o^{16}$. The third set of cams on the zone $O^6$ while operating the group of contacts $o'$ to $o^{10}$ energizes the relay $O^5$ which in turn connects the common wire 127 to the strip $K^2$ and the impulses are transmitted as before. This procedure is kept up until the relay $O^6$ operates and transfers the last set of impulses and contacts $o^{16}$ have sent the last rotary impulse over wire 128. After the drum has made one complete rotation, the cam of the zone $O^5$ operates the plunger which opens the contacts $o^{18}$, thereby releasing the relay $T^3$. This relay in falling back, disconnects the two wires 127 and 128 from the wires 120 and 121, thereby preventing further impulses from going over the trunk. During one complete rotation and while the relay $T^3$ was energized, the circuit of the lamp $L'$ was closed and the lighting of this lamp notified the operator that the sending machine was busy.

Referring to Fig. 6, I have shown the simplest form of the invention, wherein a subscriber's line is connected directly to the first selector trunk and to this trunk there being connected a jack and a signal lamp which appears before an operator. There will be a group of trunks allotted to each operator. The branches of the trunk which are connected to jacks and appear before the operators are simply used for receiving the calls and transmitting the impulses to the switches for completing the connection, after which they become dead as they form no part of the talking circuit. The relays S and S' furnish battery supply for the calling subscriber to signal the operator and clear out the connection at the end of the conversation. The relay S² is a locking relay and is energized by the relay S³ which is only operated when the operator presses the starting button to start the call. The operation of the relay S² extinguishes the lamp L. The relay S³ is a cut-off relay and remains energized during the transmission of the impulses, severing the trunk wires so as to prevent annoying clicks to the calling subscriber. The relays E and E' are operated by the sending machine over the wires 113 and 114 respectively and in turn repeat the impulses to the trunk wires 105 and 106. The relay E² has its circuit closed when the relays E and E' are energized simultaneously, as would be the case when the operator has her telephone set across the wires 113 and 114. The operation of the relay E² connects the wires 113 and 114 respectively directly to the trunk wires 105 and 106, thus enabling the operator to converse with the calling subscriber.

Referring again to Figs. 4ᵃ and 4ᵇ, the operator observing the signal lamp lighted places the plug P into the trunk jack J and depresses the button Oᵇ, Fig. 4ᵇ, closing the circuit of the relay T', which connects her telephone set directly across the tip and sleeve of the plug P. The operation of the relays T² and T³ have already been described.

Referring now to Fig. 5, I have shown circuits of a first selector, second selector and connector switches, as described in Letters Patent 815,321 and 815,176, granted March 13, 1906 to Keith and Erickson. I will not attempt to describe in detail. The first selector switch X consists of the vertical relay D, which when energized closes the circuit of the vertical magnet V¹⁰ which in turn causes the spindle x carrying the wipers to step up vertically. The rotary relay D' when energized operates the private relay F causing the side switches to take one step. The rotary magnet L¹⁰ has its circuit closed after the side switches have made one movement and will continue to vibrate causing the spindle x to rotate until the test wiper finds a contact free from ground. As soon as this happens, the side switches make still another movement disconnecting the vertical and rotary relays from the trunk wires and closing the trunk wires themselves through to the trunk wipers. The last movement of the side switches also connects the trunk release relay C to ground through the test wiper. The magnet K is the release magnet and when operated restores the switch to its normal position. The circuits of the second selector switch X' are similar to those of the first selector switch and need not be described. Referring now to the connector switch X² the circuits shown are the same as in the Letters Patent before referred to, with the exception of placing the relay G² in place of the release magnet K². Instead of testing on a third wire or test wiper, I do the testing directly on one side of the line. In place of the ordinary back release relays which were connected to the trunk wires 163 and 164 respectively, I have replaced the relays D⁶ and D⁷ with bridged battery between them for supplying current to the called subscriber and also for controlling the ringing relay Y. The ringing relay Y is energized when the sleeve relay D⁷ is energized and disconnected when the tip relay D⁶ is operated closing the circuit of the relay D⁸ which locks and prevents generator current flowing out over the line after the called party has answered. This relay is kept locked by means of the contact springs xᵃ and xᵇ until the switch has been restored to its normal position. The vertical relay D⁴, the rotary relay D⁵ and the private relay F² remain unchanged and the method of releasing is the same.

Referring now to Fig. 4, the first selector trunk, as shown is identical with that of Fig. 6, with the exception that the subscribers' lines are not permanently connected to the trunk, but are connected to the trunk by means of primary selectors shown in Figs. 2, 3, 3ᵃ and 3ᵇ, and in Fig. 6, a cut-off relay S⁴ is provided. In this case a smaller number of first selector trunks will be required, as it will only be necessary to furnish enough of them to take care of, or handle the incoming calls, which ordinarily would not require 10 per cent. of connective apparatus or trunks. The trunk wires 105 and 106, as in Fig. 6 are connected directly to a first selector switch in Fig. 5, while the wires 111, 112, 113 and 114 will join Fig. 4ᵃ. In Fig. 4 the wire leading to the transfer relays of the primary selector outfit is normally connected to ground through the contacts s²² and s⁵ of the relay S' and the locking wire for the tens and units relay is connected to the normally open contact s²¹ of the relay S and through the normally closed contacts s²³ and s²⁴ of the relay S² to battery. After the calling line by means of the primary selector relay becomes connected to an idle first selector trunk, the sleeve relay S' is connected in series with the line cut-off relay. The cut-off relay becoming energized closes the circuit of the relay S through the subscriber's telephone. The energizing of the relay S' closes the circuit of the lamp L by the following path: ground, $s^5$, $s^4$, $s^7$, $s^6$, 111, L to battery B. The operator getting this signal inserts the plug P connected with the sending machine into the jack J associated with the lamp L. She then presses the listening key $O^8$, Fig. $4^b$, closing the circuit of the relay T', which in turn connects her telephone set across the wires 120 and 121 and from there through the trunk jack to the relays E and E', which at once becomes energized. The energizing of these relays closes the circuit of the relay $E^2$ by the following path: battery B, $s^5$, $s^{10}$, 108, $e^6$, $e^7$, $e'$, 109, $E^2$ to ground. The energizing of the relay $E^2$ connects the wires 113 and 114 respectively to the wires 105 and 106. The operator's set is now connected directly across the trunk wires and the relays E and E' supply her with talking battery. After getting the number desired, she sets up the proper buttons on her key set corresponding to the number wanted, after which she presses the starting button $O^9$ which closes the circuit of the relay $T^2$ which in turn closes the circuit of the relay $T^3$. The relay $T^3$ closes the circuit of the cut-off relay $S^3$ in the first selector trunk by the following path: ground, $t'$, $t^{14}$, 122, $p^2$, $j^2$, 112, $S^3$ to battery B. The operation of this relay opens the trunk wires 103, 105 and 104, 106. The relay $T^3$ at the same time closes the circuit of the guard lamp L' which indicates that the key set is busy. The energizing of the relay $T^2$ disconnects the impulse wires 127 and 128 from the trunk wires 120 and 121. As soon as the sending machine in revolving reaches the starting point, the relay $T^2$ becomes deënergized and the first set of impulses corresponding to the thousands numeral is transmitted to the relay E of the first selector trunk. Suppose the number wanted was 2345. The operator would depress the following buttons: in the first strip K, the second button $k^2$; in the second strip K', the third button $k^3$; in the third strip $K^2$ the fourth button $k^4$ and in the strip $K^4$ the fifth button $k^5$. After the relay $P^2$ becomes deënergized, the first set of impulses are sent to the relay E of the first selector trunk by the following path: battery B, $o^2$, $k^2$, 136, contacts of the relay $O^2$, 127, $t$, $t'$, 125, $t^9$, $t^8$, 120, $p$, $j$, 114, E to ground. This relay receiving two impulses from the sending machine repeats these impulses to trunk wire 105 by the following path: battery B, $e^{10}$, $e^{11}$, $e^3$, $e^2$, 105. These two impulses going over 105 side of the trunk operate the relay D in the first selector switch which in turn closes the circuit of the vertical magnet $V^{10}$, causing the spindle $x$ to step up vertically to the second row of contacts. After this set of impulses has been sent a rotary impulse is sent to the relay E' by the following path: ground, $o^{10}$, $L^2$, 128, $t^2$, 126, $t^{10}$, $t^{11}$, 121, $t'$, $j'$, 113, E' to battery. The relay E' in turn repeats this impulse to the rotary relay D' over trunk wire 106. The operation of the relay D' closes the circuit of the private relay F which in turn causes the side switches to take one step cutting on the rotary magnet $L^{10}$ which causes the spindle to rotate until the test wiper finds a contact idle or free from ground. As soon as this happens, the private relay F becomes deënergized and the side switches take one more step disconnecting the rotary magnet causing the switch to come to rest with the wipers resting on contacts leading to an idle second selector switch. The last step of the side switch closes the trunk wires onto the trunk wipers and connects the back or trunk release relay directly from ground to the test wiper, rendering the multiples of the bank contact on which it rests busy for other calls. After this rotary impulse has passed, a second set of impulses pass through to the wire 127 by the following path: battery B, $c^2$, $k^3$ of the strip K', 137, $L^4$, contacts of the relay $O^4$, 127. These three impulses operate the relay E, which repeating the impulses to the trunk wire 105 operates the vertical relay $D^2$ in the second selector switch causing the spindle to step up vertically to the third row of contacts. After this group of impulses, a second rotary impulse is sent over wire 128 as before, operating the relay K', which in turn repeats the impulse to the trunk wire operating the relay $D^3$. The relay $D^3$ closes the circuit of private relay F' causing the side switches to take one step cutting on the rotary magnet $L^{20}$, causing the switch to rotate until the test wiper finds an idle contact whereupon the relay F' becomes deënergized, causing the side switches to take one more step, cutting off the rotary magnet $L^{20}$ and causing the switch to come to rest with its wipers on contacts leading to an idle connector switch. The side switches in taking the last step close the trunk wires onto the trunk wipers and connect the release relay directly from ground to the test wiper, rendering the switch busy for other calls. After the second rotary impulse a third set of impulses are transmitted over the wire 127 by the following path: battery B, $o^4$, $k^4$ of the strip $K^2$, 138, the lamp $L^5$, in series through the contacts of the relay $O^5$ to 127. These impulses operate the relay E which in turn repeats the impulses to the relay $D^4$ in the connector switch, which in turn closes the circuit of the magnet $V^{30}$, causing the switch to step up vertically to the fourth row of contacts. The third rotary impulse going over the wire 128 to the relay E' which in turn repeats the impulse to the relay D⁵, closing the circuit of the relay F² and causing the side switches to take one step on its deënergization. The side switch in taking this step disconnects the vertical magnet and in its place connects the rotary magnet L²⁰ and also connects the tip of the trunk to the test relay G² through the normally open contacts of the relay F². The fourth set of impulses are sent over the wire 127 by the following path: battery B, o⁵, k⁵ of the strip X³, wire 139 with the lamp L³ in series through the contacts of the relay O⁶ to wire 127. These impulses operate the relay E, which in turn repeats the impulses to the relay D⁵ which now closes the circuit of the magnet L²⁰ causing the switch to rotate and come to rest on the fifth set of contacts in the fourth row. After the fourth set of impulses, the last rotary impulse is sent, which operates the relay E, closing the circuit of the relay F² which in turn connects the test relay G² to the tip side of the line through the trunk wiper. If the line is busy, the relay G² will become energized and close the circuit of the release magnet K² and restore the switch. After the last rotary or test impulse has been sent, the cam on the drum opens the contacts o¹⁶ which unlocks the relay T'. This relay in falling back, disconnects the impulse wires from the main trunk wires and extinguishes the guard lamp L'. This relay in falling back also removes ground from the wire 122 leading to P² of the plug P, thereby deënergizing the relay S², in Fig. 4. This relay in falling back closes the trunk wires 103, 105 and 104, 106, thus completing the connection from the calling subscriber to the connector switch and called subscriber's line, assuming of course that the latter is not already busy. The plug P can now remain in the trunk jack without affecting the main trunk, for the relay S² is now locked and although the operator can push her listening key and bridge her telephone set across the wires 113 and 114 and operate the two relays E and E', there will be no effect produced, because the relay E cannot be operated, as its circuit is locked through the contacts s¹⁰ and s⁸ of the relay S². It will be seen from this that after an operator has received a call and established the connection she is afterward cut out and not able to listen in on the main trunk, thus providing absolute secrecy to the subscribers. The operator upon getting another signal from a line or trunk withdraws the plug from the jack last used and inserts it into the calling jack associated with the calling lamp and performs the same operation with the same plug as already described. After the guard lamp L' is extinguished, which indicates that the key set is idle, she can either leave the plug in the jack last used, or withdraw it and let it rest on her key shelf as in ordinary manual systems. If the called line is not busy, the relay G² fails to operate and after the last rotary impulse has passed, the side switches take the last step, cutting off the rotary magnet and test relay and at the same time closes the trunk wires onto the trunk wipers. As soon as this happens, the relay D⁷ is placed in series with the line cut-off relay of the called line. The relay D⁷ in operating, closes the circuit of the ringing relay Y by the following path: battery B, 173, d¹, d², d³, d⁴, 170, Y commutator to ground. The ringing relay becoming energized, opens and closes its contacts under the influence of the commutator. When energized, it disconnects the calling end of the trunk and connects generator current across the called end, thus ringing the subscriber's telephone. When the called subscriber answers the relay D⁸ becomes energized when the relay Y is in a deënergized condition. The operation of the relay D⁸ closes the circuit of the locking relay D⁹ whose circuit is maintained through the contacts x⁵ and x⁶. The ringing relay Y is now disconnected and generator current ceases to flow over the called line. At the end of the conversation, when the calling subscriber hangs up his telephone, the relay S in Fig. 4, immediately falls back, placing battery on the trunk wires to the switches through the contacts of the relay S² which are now closed. The relay S, in falling back, opens the contacts s²⁰ and s²¹ thereby removing battery from the locking wire of the tens and units relays of the primary selector set. These relays in falling back disconnect the trunk wires from the line, thereby deënergizing the relay S', which in falling back opens the circuit of the relay S². The operation of this last relay removes battery from the trunk wires leading to the switches. Battery being thus momentarily placed on the trunk wires closes the circuits of the relays D⁴ and D⁵ in the connector switch. The joint action of these two relays places the relays G' and G² in series. The operation of the relay G² restores the connector switch while the operation of the relay G' places the magnet K' in series with the relay G. The operation of the magnet K' restores the second selector switch while the operation of the relay G' in turn operates the release magnet K restoring the first selector switch.

Referring to the modification shown in Fig. 6, the method of putting through a call is identical with that already described, the only difference being between the connector switch and the called line for outgoing calls. By referring to Fig. 5 it will be noticed that the test wiper x¹⁰ is multiplied to the sleeve wiper. In the case already described, this test wiper is not used, but in connection with the modification shown in Fig. 6 it is necessary. By placing the Fig. 6 after Fig. 5, it will be seen that after a connection is completed to the called line, the cut-off relay S⁴ is placed in series with the relay D⁷ through the wiper $x^6$ and contact $x^{20}$. The operation of the relay S⁴ disconnects the relays S and S' from the trunk wires or line, thus preventing their operating and lighting the signal lamp when the line is called. We now have the same conditions as in the case already described. As the two relays D⁷ and S⁴ are in series and the ringing relay is in action and when the called party answers, the ringing relay is disconnected by means of the operation of the relay D⁶. In Fig. 6, the relay S² is sluggish in its action while the relay S is quick-acting, which permits an impulse of long enough duration to be placed on the trunk wires to release the switches. With the foregoing description, it will be noticed that the relay S⁴ is only operated for outgoing calls, while for incoming calls the operation of the various parts of the trunk are identical with that of Fig. 4.

Having thus described my invention what I claim and desire to secure by Letters Patent of the United States is:

1. In a telephone exchange system, the combination with a plurality of lines to be interconnected, automatic switching apparatus for effecting such interconnection, and manual controlling means for the switching apparatus comprising a variable signal transmitter, a motor constantly driving the same, a set of push buttons forming part of the variable signal transmitter and adjustable to determine the signal to be transmitted, and means operated from the transmitter normally preventing transmission through the buttons, but adapted to be set so as to commence said transmission at a definite predetermined point in each cycle of operation of the transmitter, together with manually operated means for connecting the transmitter and the parts operated therefrom to the switching apparatus.

2. In a telephone exchange system, a plurality of lines to be interconnected, a number of trunk circuits less than the number of lines, automatic switches connected to the trunk circuits containing line multiples, a number of operators' senders less than the number of trunks, with means responsive to changes in the lines, controlling certain of said automatic switches to connect the trunks to calling lines, a jack for each trunk and a terminal plug for each sender, adapted to connect the senders to the trunks in order to control certain other of the automatic switches.

3. In a telephone exchange system, a plurality of lines to be interconnected, a number of trunk circuits less than the number of lines, automatic switches associated with the trunks containing line terminals, and an operator's sending device, an operator's telephone, a jack for each trunk, and a terminal plug member common to both the sending device and the operator's telephone and adapted through the jacks to connect them to any of the trunks.

4. A semi-automatic telephone exchange system comprising a plurality of lines to be interconnected, a number of automatic switches less than the number of lines, a number of operators' sending or controlling devices less than the number of switches, a similar number of operators' telephones, a plurality of jacks connected to the several switches whereby access can be had to any of the switches for directive purposes, and terminal plug members common each to both an operator's telephone and sending device and adapted to coöperate with the jacks of any switch, whereby all of the operators' sets and sending devices are rendered interchangeable, are simultaneously connected to the switch connections, and are entirely separated from the switch connections when not in use, substantially as described.

5. A semi-automatic telephone exchange system comprising a plurality of lines to be interconnected, a number of automatic switches less than the number of lines, and a number of operators' sending or controlling devices less than the number of switches, a like number of operators' telephones, with means to bring a sending device and operator's telephone into temporary association with the various switches for actuating the same, comprising a pair of jacks for each trunk and a pair of rigidly connected plugs adapted to connect with any pair of jacks, one of said plugs connecting with the sending device and the other with the operator's telephone, whereby the operator's sets aforesaid are rendered interchangeable, and are entirely disconnected when not in use, substantially as described.

6. In a telephone exchange system, a plurality of lines to be interconnected, a number of trunk circuits less than the number of lines, automatic switches adapted to connect said trunk circuits to called lines, a plurality of operators' senders for controlling said automatic switches, said senders being less than the number of trunks, a similar number of operators' telephones, automatic means for connecting each trunk with a calling line and manually controlled means for connecting the said senders to the trunks, comprising groups of jack contacts for the trunks, and a terminal switching device common to both an operator's telephone and sending device, and adapted to coöperate with any group of said jack contacts whereby said sending device and operator's telephone are simultaneously connected and disconnected from the trunks and are rendered interchangeable.

7. In a telephone exchange system, a plurality of lines to be interconnected, a number of trunk circuits less than the number of lines, automatic switches for connecting said trunk circuits with called subscribers' lines, an operator's sender for controlling said automatic switches, an operator's telephone, automatic means for connecting the trunks to calling lines and manually controlled means to connect said sender to said trunk circuits, comprising groups of jack contacts for the trunks, and a terminal switching device common to both an operator's telephone and sending device, and adapted to coöperate with any group of said jack contacts whereby said sending device and operator's telephone are simultaneously connected and disconnected from the trunks and are rendered interchangeable.

8. In a telephone exchange system, a plurality of lines to be interconnected, a number of trunk circuits less than the number of lines, automatic switches adapted to connect said trunk circuits to called lines, a plurality of operators' senders for controlling said automatic switches, said senders being less than the number of trunks, a similar number of operators' telephones, a rotary switch for connecting each trunk with a calling line and manually controlled means for connecting the said senders to the trunks, comprising groups of jack contacts for the trunks, and a terminal switching device common to both an operator's telephone and sending device, and adapted to coöperate with any group of said jack contacts whereby said sending device and operator's telephone are simultaneously connected and disconnected from the trunks and are rendered interchangeable.

9. In a telephone exchange system, a plurality of lines to be interconnected, a number of trunk circuits less than the number of lines, automatic switches for connecting said trunk circuits with called subscribers' lines, an operator's sender for controlling said automatic switches, an operator's telephone, rotary switches for connecting the trunks to calling lines and manually controlled means to connect said sender to said trunk circuits, comprising groups of jack contacts for the trunks, and a terminal switching device common to both an operator's telephone and sending device, and adapted to coöperate with any group of said jack contacts whereby said sending device and operator's telephone are simultaneously connected and disconnected from the trunks and are rendered interchangeable.

10. In a telephone exchange system, a plurality of lines to be interconnected, a number of trunk circuits less than the number of lines, automatic switches adapted to connect said trunk circuits to called lines, a plurality of operators' senders for controlling said automatic switches, said senders being less than the number of trunks, a similar number of operators' telephones, means controlled by the receiver hook of a subscriber's instrument for connecting each trunk with a calling line and means for connecting the said senders to the trunks, comprising groups of jack contacts for the trunks and a terminal switching device common to both an operator's telephone and sending device, and adapted to coöperate with any group of said jack contacts whereby said sending device and operator's telephone are simultaneously connected and disconnected from the trunks and are rendered interchangeable.

11. In a telephone exchange system, a plurality of lines to be interconnected, a number of trunk circuits less than the number of lines, automatic switches for connecting said trunk circuits with called subscribers' lines, an operator's sender for controlling said automatic switches, an operator's telephone, means controlled by the hooks at the subscribers' instruments for connecting the trunks to calling lines and means to connect said sender to said trunk circuits, comprising groups of jack contacts for the trunks, and a terminal switching device common to both an operator's telephone and sending device, and adapted to coöperate with any group of said jack contacts whereby said sending device and operator's telephone are simultaneously connected and disconnected from the trunks and are rendered interchangeable.

12. In a telephone exchange system, a plurality of lines to be interconnected, a number of trunk circuits less than the number of lines, automatic switches adapted to connect said trunk circuits to called lines, a plurality of operators' senders for controlling said automatic switches, said senders being less than the number of trunks, a normally continually rotating switch for connecting each trunk with a calling line and manually operated means for connecting the said senders to the trunks.

13. In a telephone exchange system, a plurality of lines to be interconnected, a number of trunk circuits less than the number of lines, automatic switches for connecting said trunk circuits with called subscribers' lines, an operator's sender for controlling said automatic switches, normally continually rotating switches for connecting the trunk to calling lines and manually operated means to connect said sender to said trunk circuits.

14. In a telephone exchange system, a plurality of lines to be interconnected, a plurality of automatic switches for effecting the interconnection, but normally disconnected from said lines, normally continually rotating switches for connecting the said automatic switches to calling lines, and an operator's sender for controlling said automatic switches, said sender comprising a keyboard having keys or buttons arranged in groups corresponding to the digits of the numbers to be called, and manually operated means for connecting said sender to any of said automatic switches.

15. In a telephone exchange system, a plurality of lines to be interconnected, a number of trunk circuits less than the number of lines, automatic switches adapted to connect said trunk circuits to called lines, a plurality of operators' senders for controlling said automatic switches, a rotary switch, per trunk, controlled by the receiver hooks at the subscriber's station for connecting the trunks with the calling lines and manually operated means for connecting the said senders to the trunks.

16. In a telephone exchange system, a plurality of lines to be interconnected, a number of trunk circuits less than the number of lines, automatic switches for connecting said trunk circuits with called subscribers' lines, an operator's sender for controlling said automatic switches, an operator's telephone, rotary switches controlled by the subscribers' receiver hooks for connecting the trunks to calling lines and a plurality of individual pairs of trunk jacks, and a coöperating pair of terminal plugs rigidly connected together, common to both the operator's sender and telephone, and interchangeably fitting any pair of said jacks, to simultaneously connect said sender and operator's telephone to said trunk circuits.

17. In a telephone exchange system, a plurality of lines to be interconnected, a number of trunk circuits less than the number of lines, automatic switches adapted to connect said trunk circuits to called lines, a plurality of operators' senders for controlling said automatic switches, said senders being less than the number of trunks, a similar number of operators' telephones, means for connecting each trunk with a calling line, a signal for each trunk and associated plug and jack connections for connecting the said senders and operators' telephones by one operation to the trunks, the plugs being individual and common to each of a sender and an operator's telephone, the jacks being individual to the trunks, and in number greater than the number of individual plugs, and all the plugs being interchangeable with respect to all of the jacks.

18. In a telephone exchange system, a plurality of lines to be interconnected, a number of trunk circuits less than the number of lines, automatic switches for connecting said trunk circuits with called subscribers' lines, an operator's sender for controlling said automatic switches, an operator's telephone, means for connecting the trunks to calling lines, a signal for each trunk and associated plug and jack connections to connect said sender and operators' telephones by one operation to said trunk circuits, the plugs being individual and common to each of a sender and an operator's telephone, the jacks being individual to the trunks, and in number greater than the number of individual plugs, and all the plugs being interchangeable with respect to all of the jacks.

19. In a telephone exchange system, a plurality of lines to be interconnected, a number of trunks less than the number of lines, terminal jacks associated with said trunks, automatic switches for connecting said trunk circuits with a wanted subscriber's line, individual signals associated with said jacks, an operator's sending device and an operator's telephone having a common terminal plug member interchangeably fitting all of the trunk jacks, and adapted to be temporarily connected with any trunk through its associated jack, means to retire the trunk signal when connection is thus effected with its jack, and means for operating the automatic switches by impulses from said sending device.

20. In a telephone exchange system, a plurality of lines to be interconnected, a number of trunk circuits less than the number of lines, terminal jacks associated with said trunks, automatic switches for connecting said trunk circuits with a wanted subscriber's line, individual signals associated with said jacks, means in said trunk circuits for operating said signals when a trunk becomes busy, an operator's sending device adapted to be temporarily connected with any trunk through its associated jack, means for operating the automatic switches by impulses from said sending device and means for retiring said signal when the sending device is first connected with a calling trunk.

21. In a telephone exchange system, a plurality of lines to be interconnected, a number of trunk circuits less than the number of lines, terminal jacks and signals associated with said trunks, automatic switches for connecting said trunk circuits with a wanted subscriber's line, an operator's impulse sending device adapted to be temporarily connected with any trunk through its associated jack, an operator's automatic listening means associated with said trunk, other means associated with said trunk for controlling the operation of said listening means and for repeating said actuating impulses to the trunk conductors for actuating said automatic switches.

22. In a telephone exchange system, subscribers' lines, a plurality of connective trunks less than the number of lines, an operator's sending device arranged to be connected with said trunks, means associated with said trunks for repeating the impulses from said sending device to said trunks, listening means controlled by said repeating means and means for preventing the sending of impulses back over the trunk to the calling line.

23. In a telephone exchange system, subscribers' lines, connective trunks therefor less than the number of lines, automatic switches, an operator's sending device arranged to be connected with any trunk, a pair of relays associated with each trunk for repeating the impulses from said sending device to said trunk, a listening relay controlled by said repeating relays and adapted to be actuated only when both of the said repeating relays are energized.

24. In a telephone exchange system, a plurality of lines to be interconnected, a number of answering jacks less than the number of lines, automatic primary switching means responsive to calls over the lines and acting to distribute the same on idle jacks, automatic switches associated with the jacks for selecting and connecting with wanted lines, and an operator's telephone and controlling device connected to a single terminal plug member adapted to coöperate interchangeably with any of said jacks, substantially as described, whereby the operator's telephone and controlling device may be together connected to the jacks by a single operation.

25. In a telephone exchange system, a plurality of lines to be inter-connected, a plurality of automatic switches for effecting the inter-connection, but normally disconnected from said lines, means for connecting the switches to calling lines, and an operator's sender for controlling said automatic switches, said sender comprising a key-board having keys or buttons arranged in groups corresponding to the digits of the numbers to be called, and plug and jack connections for connecting said sender to any of said automatic switches.

In testimony whereof I affix my signature in presence of two witnesses.

EDWARD E. CLEMENT.

Witnesses:
 HUGH M. STERLING,
 JAMES H. MARR.